US012071159B2

(12) United States Patent
Zhou

(10) Patent No.: US 12,071,159 B2
(45) Date of Patent: *Aug. 27, 2024

(54) AERIAL VIEW GENERATION FOR VEHICLE CONTROL

(71) Applicant: PlusAI, Inc., Santa Clara, CA (US)

(72) Inventor: Mianwei Zhou, Cupertino, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,813

(22) Filed: Mar. 2, 2023

(65) Prior Publication Data

US 2024/0034350 A1 Feb. 1, 2024

Related U.S. Application Data

(63) Continuation of application No. 17/877,726, filed on Jul. 29, 2022, now Pat. No. 11,634,156.

(51) Int. Cl.
*B60W 60/00* (2020.01)
*B60W 50/06* (2006.01)
*G06N 20/00* (2019.01)

(52) U.S. Cl.
CPC .......... *B60W 60/001* (2020.02); *B60W 50/06* (2013.01); *G06N 20/00* (2019.01); *B60W 2420/403* (2013.01); *B60W 2556/50* (2020.02)

(58) Field of Classification Search
CPC ............... B60W 60/001; B60W 30/12; B60W 30/0953; B60W 30/18163; B60W 50/06;
(Continued)

(56) References Cited

U.S. PATENT DOCUMENTS 10,684,621 B2 6/2020 Matsubara et al.
10,699,576 B1 6/2020 Shih
(Continued)

FOREIGN PATENT DOCUMENTS

CA        3027627 A1    1/2019
WO   WO2022057630 A1    3/2022

OTHER PUBLICATIONS

Häne et al., "Obstacle Detection for Self-Driving Cars Using Only Monocular Cameras and Wheel Odometry," 2016, Publisher: IEEE, 8 pgs.

(Continued)

*Primary Examiner* — Yuri Kan
(74) *Attorney, Agent, or Firm* — Morgan, Lewis & Bockius LLP

(57) ABSTRACT

This application is directed to aerial view generation for vehicle control. A vehicle obtains a forward-facing view of a road captured by a front-facing camera of a vehicle and applies a machine learning model to process the forward-facing view to predict determine a trajectory of the vehicle and a road layout based on a Frenet-Serret coordinate system of the road for the vehicle. The trajectory of the vehicle is combined with the road layout to predict an aerial view of the road, and the aerial view of the road is used to at least partially autonomously drive the vehicle. In some embodiments, the machine learning model is applied to process the forward-facing view to determine a first location of each of an obstacle vehicle in the Frenet-Serret coordinate system. The first location of the obstacle vehicle is converted to a vehicle location on the aerial view of the road.

20 Claims, 15 Drawing Sheets

(58) Field of Classification Search
CPC ...... B60W 50/14; G06T 11/206; G06T 17/20; G08G 1/167; G06V 20/588; G01C 21/3658; G05D 1/0217; G06F 3/017

See application file for complete search history.

(56) References Cited

U.S. PATENT DOCUMENTS

| | | | |
|---|---|---|---|
| 11,124,207 B2 | 9/2021 | Naithani et al. | |
| 11,267,477 B2 | 3/2022 | Large | |
| 11,465,031 B2 | 10/2022 | Churchman et al. | |
| 11,628,859 B1* | 4/2023 | Zhou | B60W 50/14 701/301 |
| 11,634,156 B1* | 4/2023 | Zhou | B60W 50/06 701/41 |
| 2010/0295849 A1* | 11/2010 | Chai | G06T 17/20 345/420 |
| 2013/0218467 A1* | 8/2013 | Ogawa | G08G 1/167 701/533 |
| 2015/0022447 A1* | 1/2015 | Hare | G06F 3/017 345/158 |
| 2015/0251656 A1 | 9/2015 | Yester et al. | |
| 2018/0004206 A1 | 1/2018 | Iagnemma et al. | |
| 2018/0321686 A1 | 11/2018 | Kanzawa | |
| 2019/0094040 A1 | 3/2019 | Lewis et al. | |
| 2019/0317507 A1 | 10/2019 | Zhang et al. | |
| 2020/0034638 A1 | 1/2020 | Brewington et al. | |
| 2020/0189580 A1* | 6/2020 | Schmidt | B60W 30/18163 |
| 2020/0216061 A1 | 7/2020 | Zidek | |
| 2020/0269843 A1* | 8/2020 | Wissing | B60W 30/18163 |
| 2020/0301434 A1* | 9/2020 | Manna | G05D 1/0217 |
| 2021/0009119 A1* | 1/2021 | Nattermann | B60W 30/0953 |
| 2021/0114604 A1 | 4/2021 | Nagaraja et al. | |
| 2021/0129863 A1* | 5/2021 | Nattermann | G01C 21/3658 |
| 2021/0156963 A1 | 5/2021 | Popov et al. | |
| 2021/0256274 A1 | 8/2021 | Kumano et al. | |
| 2021/0362741 A1 | 11/2021 | Han et al. | |
| 2021/0380106 A1 | 12/2021 | Chinni | |
| 2022/0091266 A1 | 3/2022 | Sivakumar | |
| 2022/0153308 A1* | 5/2022 | Manna | B60W 30/12 |
| 2022/0153315 A1 | 5/2022 | Zeng et al. | |
| 2022/0176881 A1* | 6/2022 | Hao | G06T 11/206 |
| 2022/0230018 A1* | 7/2022 | Kundu | G06V 20/588 |
| 2022/0236075 A1 | 7/2022 | Ho et al. | |

OTHER PUBLICATIONS

Aldibaja et al., "On Autonomous Driving: Why Holistic and Feature Matching Must be Used in Localizaton?," 2017, Publisher: IEEE, 2 pgs.

Zhou, Office Action, U.S. Appl. No. 17/877,726, Oct. 11, 2022, 20 pgs.

Zhou, Office Action, U.S. Appl. No. 17/877,735, Oct. 27, 2022, 12 pgs.

Zhou, Notice of Allowance, U.S. Appl. No. 17/877,726, Dec. 20, 2022, 9 pgs.

Zhou, Notice of Allowance, U.S. Appl. No. 17/877,735, Dec. 29, 2022, 11 pgs.

Zhou, Office Action, U.S. Appl. No. 18/116,821, Sep. 14, 2023, 15 pgs.

Zhou, Final Office Actiion, U.S. Appl. No. 18/116,821, Mar. 28, 2024, 12 pgs.

* cited by examiner

*1300*

Obtain a forward-facing view of a road captured by a front-facing camera of a vehicle 1302

↓

Apply a machine learning model to process the forward-facing view to predict determine (i) a trajectory of the vehicle and (ii) a road layout based on a Frenet-Serret coordinate system of the road for the vehicle 1304

> The aerial view includes at least one simulated lane line that, at a distance of 200 meters form the vehicle, is within 10 centimeters of a real world lane line on the road 1310

> The machine learning model is a semantic segmentation network 1312

↓

Combine the trajectory of the vehicle and the road layout to predict an aerial view of the road 1306

> The road layout includes an edge or lane line, and the trajectory includes a plurality of first points 1314
>
>> Determine a curvature of the trajectory at each of the plurality of first points 1316
>>
>> ↓
>>
>> Apply the curvature of the trajectory at each of the plurality of first points to a respective second point of the edge or lane line 1318
>>
>> For each of the plurality of first points, a respective line connecting the first point of the trajectory and the respective second point of the edge or lane line is perpendicular to a tangent direction of the trajectory at the first point 1320
>>
>> Each first point of the trajectory has a first distance from a starting point of the trajectory, and the respective second point of the edge or lane line has a second distance from a starting point of the edge or lane line, the first and second distances being equal to each other 1322

↓

Use the aerial view of the road to at least partially autonomously drive the vehicle 1308

> Control driving of the vehicle and plan control of the vehicle, where the aerial view of the road is applied as one of a plurality of inputs for at least partially autonomously driving the vehicle

Figure 13

AERIAL VIEW GENERATION FOR VEHICLE CONTROL

RELATED APPLICATIONS

This application is continuation of U.S. patent application Ser. No. 17/877,726, titled "Aerial View Generation for Vehicle Control", filed Jul. 29, 2022, which is incorporated by reference in its entirety.

This application is related to U.S. patent application Ser. No. 18/116,821, titled "Vehicle Placement on Aerial Views for Vehicle Control", filed Mar. 2, 2023, which is a continuation of U.S. patent application Ser. No. 17/877,735, titled "Vehicle Placement on Aerial Views for Vehicle Control", filed Jul. 29, 2022. Each of these patent applications is incorporated by reference in its entirety.

TECHNICAL FIELD

The present application generally relates to vehicle technology, and more particularly to, computer-aided methods and systems for creating an aerial view of a road from a forward-facing view of the road to at least partially autonomously control a vehicle.

BACKGROUND

Vehicles are now capable of self-driving with different levels of autonomy. Each of these levels is characterized by the relative amount of human and autonomous control. For example, The Society of Automotive Engineers (SAE) defines 6 levels of driving automation ranging from 0 (fully manual) to 5 (fully autonomous). These levels have been adopted by the U.S. Department of Transportation. Autonomous vehicles provide numerous advantages including: (1) lowering the number of vehicles on the roads (most privately owned vehicles are driven a small fraction of the time); (2) more predictable and safer driving behavior than human driven vehicles; (3) less emissions if there are fewer vehicles on the road, and they are electrically powered; (4) improved fuel efficiency if they are electric vehicles; (5) increased lane capacity; (6) shorter travel times; and (7) increased mobility for users who are incapable of diving.

Autonomous vehicle control typically requires an aerial view of the vehicle on the road. Vehicles, however, are unable to capture aerial views of themselves on the road. Instead, sensors capture sensor data around the vehicle, such as video and LiDAR data of the road. This sensor data is then interpreted to generate an aerial view from an ego vehicle's perspective for the purposes of controlling and planning driving of the ego vehicle. However, such aerial views tend to be inaccurate as compared to the actual road ahead of the vehicle. Such inaccuracy makes it impossible to identify lanes, vehicles, and other objects in the lanes. Additionally, such aerial views are only somewhat reliable within a limited range (e.g., 50 meters) from the ego vehicle. This limited range accuracy is especially problematic for vehicles that require control (e.g., braking) further out from the vehicle. As such, it is desirable to develop a more accurate method for generating the aerial view to facilitate autonomous vehicle controlling and/or planning.

SUMMARY

This application is directed to methods, systems, and non-transitory computer readable storage media for generating an aerial view of a road from a forward-facing view of the road. In some embodiments, the forward-facing view of the road is captured by a camera of the vehicle. In some embodiments, no additional sensor data collected by a sensor other than the camera are required for generating the aerial view. A machine learning model is applied to generate (i) a trajectory of the vehicle in a current lane, and (ii) a road layout in a Frenet-Serret coordinate system of the road. The aerial view is generated by combining the trajectory of the vehicle and road layout in the Frenet-Serret coordinate system. Objects (e.g., obstacle vehicles) and lanes are identified in the aerial view of the road.

In some embodiments, a lateral position of an obstacle vehicle from a lane line is determined with a desired accuracy level (e.g., within 10 centimeters), and the aerial view including lane lines and the obstacle vehicles is displayed in the aerial view up to a distance that is greater than 100 meters, 150 meters, or 200 meters. This is particularly important for autonomous trucks that are typically required to brake within a braking distance. This allows for planning and autonomous control within the braking distance of a truck by detecting a lane changing event in front of the vehicle and initiating accurate and prompt braking or other control.

In one aspect, a method is implemented for at least partially autonomously driving a vehicle that includes one or more processors and memory. The method includes obtaining a forward-facing view of a road captured by a front-facing camera of a vehicle. The method further includes applying a machine learning model to process the forward-facing view to determine (i) a trajectory of the vehicle, and (ii) a road layout based on a Frenet-Serret coordinate system of the road for the vehicle. The method further includes combining the trajectory of the vehicle and the road layout to predict an aerial view of the road, and then using the aerial view of the road to at least partially autonomously drive the vehicle.

In some embodiments, the method further includes applying the machine learning model to process the forward-facing view of the vehicle to (i) identify one or more obstacle vehicles in the forward-facing view, and (ii) determine a first location of each obstacle vehicle in the Frenet-Serret coordinate system of the road. The method further includes converting the first location of each obstacle vehicle to a vehicle location on the aerial view of the road. Further, in some embodiments, the method further includes displaying the aerial view of the road (e.g., on a display of the vehicle) and visualizing the one or more obstacle vehicles on the aerial view based on the vehicle location of each obstacle vehicle.

In another aspect of the application, a method is implemented for at least partially autonomously driving a vehicle that includes one or more processors and memory. The method includes obtaining a forward-facing view of a road captured by a front-facing camera of a vehicle. The forward-facing view of the road includes one or more obstacle vehicles. The method further includes applying a machine learning model to process the forward-facing view to determine a first location of each obstacle vehicle in the Frenet-Serret coordinate system of the road. The method further includes obtaining an aerial view of the road, placing the one or more obstacle vehicles on the aerial view of the road, and then using the aerial view of the road to at least partially autonomously drive the vehicle.

According to another aspect of the present application, a vehicle includes one or more processing units and memory having a plurality of programs stored in the memory. The programs, when executed by the one or more processing units, cause the vehicle to perform any of the methods for at least partially autonomously driving the vehicle as described above.

According to another aspect of the present application, a non-transitory computer readable storage medium stores a plurality of programs configured for execution by a vehicle having one or more processing units. The programs, when executed by the one or more processing units, cause the vehicle to perform any of the methods for at least partially autonomously driving the vehicle as described above.

BRIEF DESCRIPTION OF DRAWINGS

The accompanying drawings, which are included to provide a further understanding of the embodiments, are incorporated herein, constitute a part of the specification, illustrate the described embodiments, and, together with the description, serve to explain the underlying principles.

FIG. 13 is a flow diagram of another example method for at least partially autonomously driving a vehicle, in accordance with some embodiments.

Like reference numerals refer to corresponding parts throughout the several views of the drawings.

DETAILED DESCRIPTION

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of the claims and the subject matter may be practiced without these specific details. For example, it will be apparent to one of ordinary skill in the art that the subject matter presented herein can be implemented on many types of electronic devices with digital video capabilities.

Various embodiments of this application are directed to generating an aerial view of a road from a forward-facing view of the road. In some embodiments, the forward-facing view of the road is captured by a camera of the vehicle. In some embodiments, no additional sensor data collected by a sensor other than the camera are required for generating the aerial view. A machine learning model is applied to generate (i) a trajectory of the vehicle in a current lane, and (ii) a road layout in a Frenet-Serret coordinate system of the road. The aerial view is generated by combining the trajectory of the vehicle and road layout in the Frenet-Serret coordinate system. Objects (e.g., obstacle vehicles) and lanes are identified in the aerial view of the road. In some embodiments, a lateral position of an obstacle vehicle from a lane line is determined with a desired accuracy level (e.g., within 10 centimeters), and the aerial view including lane lines and the obstacle vehicles is displayed in the aerial view up to a distance that is greater than 100 meters, 150 meters, or 200 meters. This is particularly important for autonomous trucks that are typically required to brake within a braking distance. This allows for planning and autonomous control within the braking distance of a truck by detecting a lane changing event in front of the vehicle and initiating accurate and prompt braking or other control.

Figure 1:
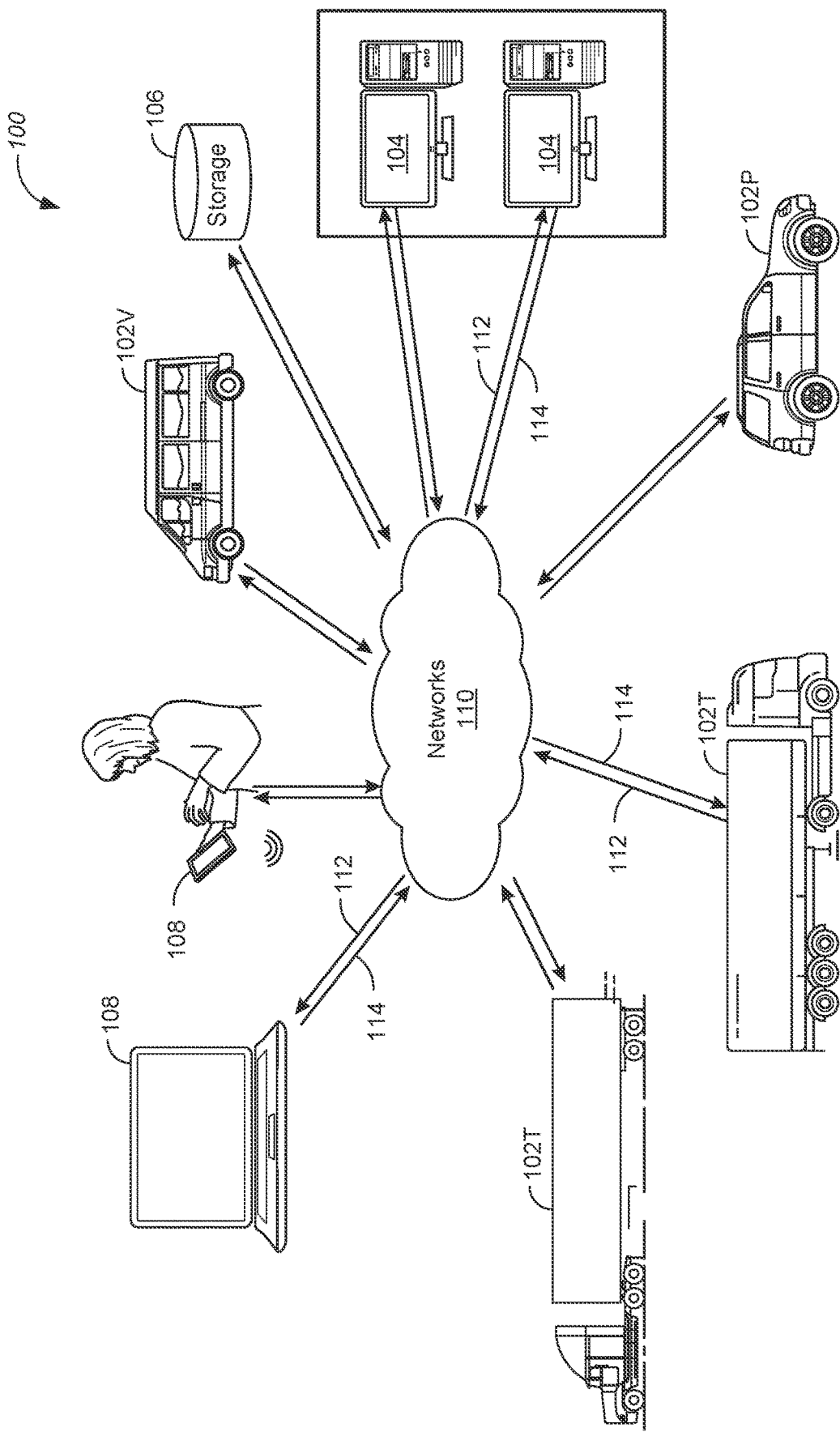
FIG. 1 is an example vehicle driving environment for a plurality of vehicles, in accordance with some embodiments.

FIG. 1 is an example vehicle driving environment 100 having a plurality of vehicles 102 (e.g., vehicles 102P, 102T, and 102V), in accordance with some embodiments. Each vehicle 102 has one or more processors, memory, a plurality of sensors, and a vehicle control system. The vehicle control system is configured to sense the vehicle driving environment 100 and drive on roads having different road conditions. The plurality of vehicles 102 may include passenger cars 102P (e.g., sport-utility vehicles and sedans), vans 102V, trucks 102T, and driver-less cars. Each vehicle 102 can collect sensor data and/or user inputs, execute user applications, present outputs on its user interface, and/or operate the vehicle control system to drive the vehicle 102. The collected data or user inputs can be processed locally (e.g., for training and/or for prediction) at the vehicle 102 and/or remotely by one or more servers 104. The one or more servers 104 provide system data (e.g., boot files, operating system images, and user applications) to the vehicle 102, and in some embodiments, process the data and user inputs received from the vehicle 102 when the user applications are executed on the vehicle 102. In some embodiments, the vehicle driving environment 100 further includes storage 106 for storing data related to the vehicles 102, servers 104, and applications executed on the vehicles 102.

For each vehicle 102, the plurality of sensors includes one or more of: (1) a global positioning system (GPS) sensors; (2) a light detection and ranging (LiDAR) scanner; (3) one or more cameras; (4) a radio detection and ranging (RADAR) sensor; (5) an infrared sensor; (6) one or more ultrasonic sensors; (7) a dedicated short-range communication (DSRC) module; (8) an inertial navigation system (INS) including accelerometers and gyroscopes; and/or (9) an odometry sensor. The cameras are configured to capture a plurality of images in the vehicle driving environment 100, and the plurality of images are applied to map the vehicle driving environment 100 to a 3D vehicle space and identify a location of the vehicle 102 within the environment 100. The cameras also operate with one or more other sensors (e.g., GPS, LiDAR, RADAR, and/or INS) to localize the vehicle 102 in the 3D vehicle space. For example, the GPS identifies a geographical position (geolocation) of the vehicle 102 on the Earth, and the INS measures relative vehicle speeds and accelerations between the vehicle 102 and adjacent vehicles 102. The LiDAR scanner measures the distance between the vehicle 102 and adjacent vehicles 102 and other objects. Data collected by these sensors is used to determine vehicle locations determined from the plurality of images or to facilitate determining vehicle locations between two images.

The vehicle control system includes a plurality of actuators for at least steering, braking, controlling the throttle (e.g., accelerating, maintaining a constant velocity, or decelerating), and transmission control. Depending on the level of automation, each of the plurality of actuators (or manually controlling the vehicle, such as by turning the steering wheel) can be controlled manually by a driver of the vehicle, automatically by the one or more processors of the vehicle, or jointly by the driver and the processors. When the vehicle 102 controls the plurality of actuators independently or jointly with the driver, the vehicle 102 obtains the sensor data collected by the plurality of sensors, identifies adjacent road features in the vehicle driving environment 100, tracks the motion of the vehicle, tracks the relative distance between the vehicle and any surrounding vehicles or other objects, and generates vehicle control instructions to at least partially autonomously control driving of the vehicle 102. Conversely, in some embodiments, when the driver takes control of the vehicle, the driver manually provides vehicle control instructions via a steering wheel, a braking pedal, a throttle pedal, and/or a gear lever directly. In some embodiments, a vehicle user application is executed on the vehicle and configured to provide a user interface. The driver provides vehicle control instructions to control the plurality of actuators of the vehicle control system via the user interface of the vehicle user application. By these means, the vehicle 102 is configured to drive with its own vehicle control system and/or the driver of the vehicle 102 according to the level of autonomy.

In some embodiments, autonomous vehicles include, for example, a fully autonomous vehicle, a partially autonomous vehicle, a vehicle with driver assistance, or an autonomous capable vehicle. Capabilities of autonomous vehicles can be associated with a classification system, or taxonomy, having tiered levels of autonomy. A classification system can be specified, for example, by industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention) as classified by the International Society of Automotive Engineers (SAE International). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator or a remote operator. The autonomous vehicle may operate solely at a given level (e.g. level 2 additional assistance or level 5 full automation) for at least a period of time or during the entire operating time of the autonomous vehicle. Other classification systems can provide other levels of autonomy characterized by different vehicle capabilities.

In some embodiments, the vehicle 102 drives in the vehicle driving environment 100 at level 5. The vehicle 102 collects sensor data from the plurality of sensors, processes the sensor data to generate vehicle control instructions, and controls the vehicle control system to drive the vehicle autonomously in response to the vehicle control instructions. Alternatively, in some situations, the vehicle 102 drives in the vehicle driving environment 100 at level 0. The vehicle 102 collects the sensor data and processes the sensor data to provide feedback (e.g., a warning or an alert) to a driver of the vehicle 102 to allow the driver to drive the vehicle 102 manually and based on the driver's own judgement. Alternatively, in some situations, the vehicle 102 drives in the vehicle driving environment 100 partially autonomously at one of levels 1-4. The vehicle 102 collects the sensor data and processes the sensor data to generate a vehicle control instruction for a portion of the vehicle control system and/or provide feedback to a driver of the vehicle 102. The vehicle 102 is driven jointly by the vehicle control system of the vehicle 102 and the driver of the vehicle 102. In some embodiments, the vehicle control system and driver of the vehicle 102 control different portions of the vehicle 102. In some embodiments, the vehicle 102 determines the vehicle status. Based on the vehicle status, a vehicle control instruction of one of the vehicle control system or driver of the vehicle 102 preempts or overrides another vehicle control instruction provided by the other one of the vehicle control system or driver of the vehicle 102.

For the vehicle 102, the sensor data collected by the plurality of sensors, the vehicle control instructions applied to the vehicle control system, and the user inputs received via the vehicle user application form a collection of vehicle data 112. In some embodiments, at least a subset of the vehicle data 112 from each vehicle 102 is provided to one or more servers 104. A server 104 provides a central vehicle platform for collecting and analyzing the vehicle data 112, monitoring vehicle operation, detecting faults, providing driving solutions, and updating additional vehicle information 114 to individual vehicles 102 or client devices 108. In some embodiments, the server 104 manages vehicle data 112 of each individual vehicle 102 separately. In some embodiments, the server 104 consolidates vehicle data 112 from multiple vehicles 102 and manages the consolidated vehicle data jointly (e.g., the server 104 statistically aggregates the data).

Additionally, in some embodiments, the vehicle driving environment 100 further includes one or more client devices 108, such as desktop computers, laptop computers, tablet computers, and mobile phones. Each client device 108 is configured to execute a client user application associated with the central vehicle platform provided by the server 104.

The client device 108 is logged into a user account on the client user application, and the user account is associated with one or more vehicles 102. The server 104 provides the collected vehicle data 112 and additional vehicle information 114 (e.g., vehicle operation information, fault information, or driving solution information) for the one or more associated vehicles 102 to the client device 108 using the user account of the client user application. In some embodiments, the client device 108 is located in the one or more vehicles 102, while in other embodiments, the client device is at a location distinct from the one or more associated vehicles 102. As such, the server 104 can apply its computational capability to manage the vehicle data 112 and facilitate vehicle monitoring and control on different levels (e.g., for each individual vehicle, for a collection of vehicles, and/or for related client devices 108).

The plurality of vehicles 102, the one or more servers 104, and the one or more client devices 108 are communicatively coupled to each other via one or more communication networks 110, which is used to provide communications links between these vehicles and computers connected together within the vehicle driving environment 100. The one or more communication networks 110 may include connections, such as a wired network, wireless communication links, or fiber optic cables. Examples of the one or more communication networks 110 include local area networks (LAN), wide area networks (WAN) such as the Internet, or a combination thereof. The one or more communication networks 110 are, in some embodiments, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol. A connection to the one or more communication networks 110 may be established either directly (e.g., using 3G/4G connectivity to a wireless carrier), or through a network interface (e.g., a router, a switch, a gateway, a hub, or an intelligent, dedicated whole-home control node), or through any combination thereof. In some embodiments, the one or more communication networks 110 allow for communication using any suitable protocols, like Transmission Control Protocol/Internet Protocol (TCP/IP). In some embodiments, each vehicle 102 is communicatively coupled to the servers 104 via a cellular communication network.

In some embodiments, deep learning techniques are applied by the vehicles 102, the servers 104, or both, to process the vehicle data 112. For example, in some embodiments, after image data is collected by the cameras of one of the vehicles 102, the image data is processed using an object detection model to identify objects (e.g., road features including, but not limited to, vehicles, lane lines, shoulder lines, road dividers, traffic lights, traffic signs, road signs, cones, pedestrians, bicycles, and drivers of the vehicles) in the vehicle driving environment 100. In some embodiments, additional sensor data is collected and processed by a vehicle control model to generate a vehicle control instruction for controlling the vehicle control system. In some embodiments, a vehicle planning model is applied to plan a driving control process based on the collected sensor data and the vehicle driving environment 100. The object detection model, vehicle control model, and vehicle planning model are collectively referred to herein as vehicle data processing models, each of which includes one or more neural networks. In some embodiments, such a vehicle data processing model is applied by the vehicles 102, the servers 104, or both, to process the vehicle data 112 to infer associated vehicle status and/or provide control signals. In some embodiments, a vehicle data processing model is trained by a server 104, and applied locally or provided to one or more vehicles 102 for inference of the associated vehicle status and/or to provide control signals. Alternatively, a vehicle data processing model is trained locally by a vehicle 102, and applied locally or shared with one or more other vehicles 102 (e.g., by way of the server 104). In some embodiments, a vehicle data processing model is trained in a supervised, semi-supervised, or unsupervised manner.

Figure 2:
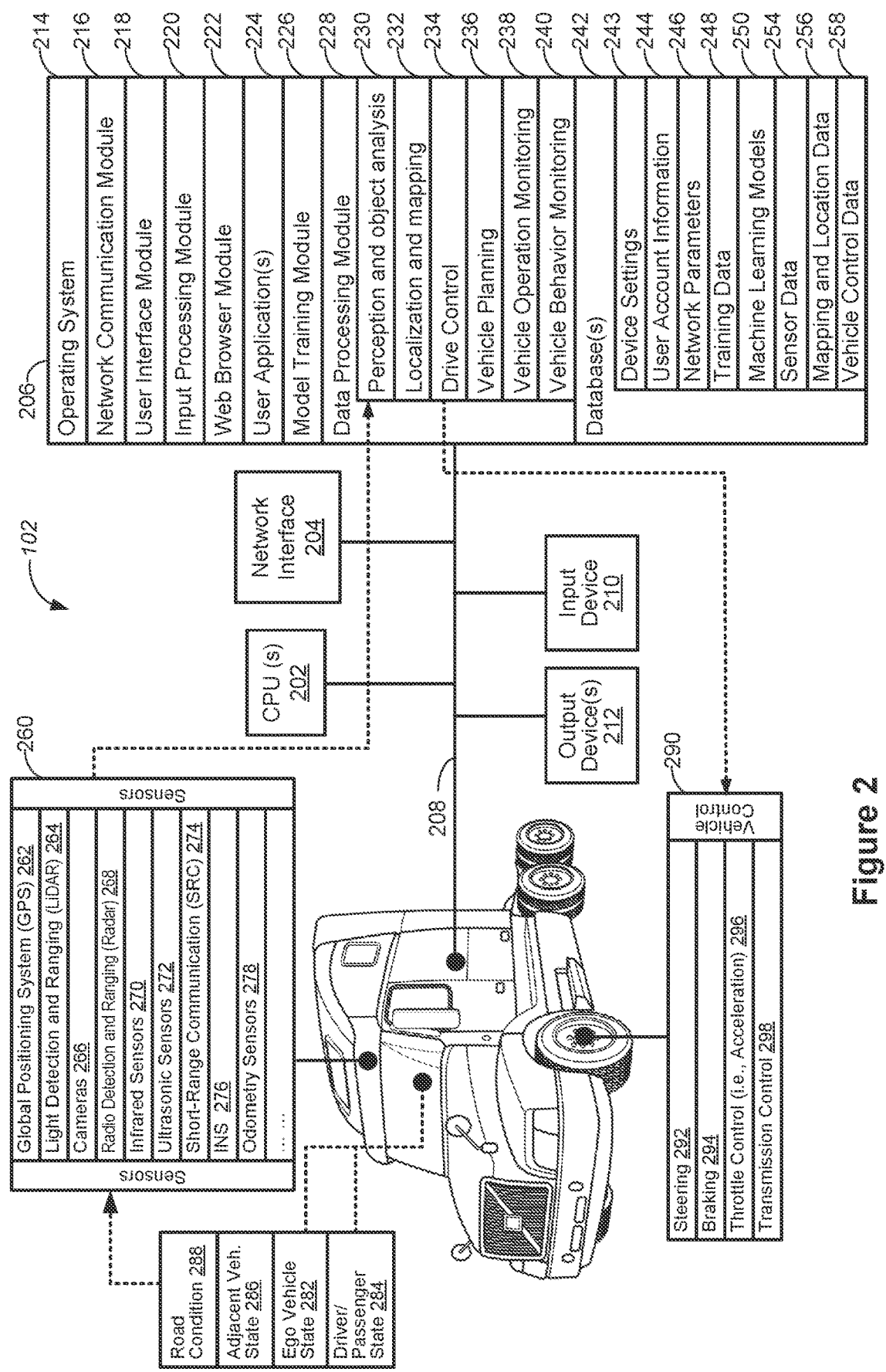
FIG. 2 is a block diagram of an example vehicle configured to be driven with a certain level of autonomy, in accordance with some embodiments.

FIG. 2 is a block diagram of an example vehicle 102 configured to be driven with a certain level of autonomy, in accordance with some embodiments. The vehicle 102 typically includes one or more processing units (CPUs) 202, one or more network interfaces 204, memory 206, and one or more communication buses 208 for interconnecting these components (sometimes called a chipset). The vehicle 102 includes one or more user interface devices. The user interface devices include one or more input devices 210, which facilitate user input, such as a keyboard, a mouse, a voice-command input unit or microphone, a touch screen display, a touch-sensitive input pad, a gesture capturing camera, or other input buttons or controls. Furthermore, in some embodiments, the vehicle 102 uses a microphone and voice recognition or a camera and gesture recognition to supplement or replace the keyboard. In some embodiments, the one or more input devices 210 include one or more cameras, scanners, or photo sensor units for capturing images, for example, of a driver and a passenger in the vehicle 102. The vehicle 102 also includes one or more output devices 212, which enable presentation of user interfaces and display content, including one or more speakers and/or one or more visual displays (e.g., a display panel located near to a driver's right hand in right-hand-side operated vehicles typical in the U.S.).

The vehicle 102 includes a plurality of sensors 260 configured to collect sensor data in a vehicle driving environment 100. The plurality of sensors 260 include one or more of a GPS 262, a LiDAR scanner 264, one or more cameras 266, a RADAR sensor 268, an infrared sensor 270, one or more ultrasonic sensors 272, a DSRC module 274, an INS 276 including accelerometers and gyroscopes, and an odometry sensor 278. The GPS 262 localizes the vehicle 102 in Earth coordinates (e.g., using a latitude value and a longitude value) and can reach a first accuracy level less than 1 meter (e.g., 30 cm). The LiDAR scanner 264 uses light beams to estimate relative distances between the scanner 264 and a target object (e.g., another vehicle 102), and can reach a second accuracy level better than the first accuracy level of the GPS 262. The cameras 266 are installed at different locations on the vehicle 102 to monitor surroundings of the camera 266 from different perspectives. In some situations, a camera 266 is installed facing the interior of the vehicle 102 and configured to monitor the state of the driver of the vehicle 102. The RADAR sensor 268 emits electromagnetic waves and collects reflected waves to determine the speed and a distance of an object over which the waves are reflected. The infrared sensor 270 identifies and tracks objects in an infrared domain when lighting conditions are poor. The one or more ultrasonic sensors 272 are used to detect objects at a short distance (e.g., to assist parking). The DSRC module 274 is used to exchange information with a road feature (e.g., a traffic light). The INS 276 uses the accelerometers and gyroscopes to measure the position, the orientation, and the speed of the vehicle. The odometry sensor 278 tracks the distance the vehicle 102 has travelled, (e.g., based on a wheel speed). In some embodiments, based on the sensor data collected by the plurality of sensors 260, the one or more processors 202 of the vehicle monitor its own vehicle state 282, the driver or passenger state 284, states of adjacent vehicles 286, and road conditions 288 associated with a plurality of road features.

The vehicle 102 has a control system 290, including a steering control 292, a braking control 294, a throttle control 296, a transmission control 298, signaling and lighting controls, and other controls. In some embodiments, one or more actuators of the vehicle control system 290 are automatically controlled based on the sensor data collected by the plurality of sensors 260 (e.g., according to one or more of the vehicle state 282, the driver or passenger state 284, states of adjacent vehicles 286, and/or road conditions 288).

The memory 206 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 206 includes one or more storage devices remotely located from one or more processing units 202. The memory 206, or alternatively the non-volatile the memory within the memory 206, includes a non-transitory computer readable storage medium. In some embodiments, the memory 206, or the non-transitory computer readable storage medium of the memory 206, stores the following programs, modules, and data structures, or a subset or superset thereof:

- an operating system 214, which includes procedures for handling various basic system services and for performing hardware dependent tasks;
- a network communication module 216, which connects each vehicle 102 to other devices (e.g., another vehicle 102, a server 104, or a client device 108) via one or more network interfaces (wired or wireless) and one or more communication networks 110, such as the Internet, other wide area networks, local area networks, metropolitan area networks, and so on;
- a user interface module 218, which enables presentation of information (e.g., a graphical user interface for an application 224, widgets, websites and web pages thereof, audio content, and/or video content) at the vehicle 102 via one or more output devices 212 (e.g., displays or speakers);
- an input processing module 220, which detects one or more user inputs or interactions from one of the one or more input devices 210 and interprets the detected input or interaction;
- a web browser module 222, which navigates, requests (e.g., via HTTP), and displays websites and web pages thereof, including a web interface for logging into a user account of a user application 224 associated with the vehicle 102 or another vehicle;
- one or more user applications 224, which are executed at the vehicle 102. The user applications 224 include a vehicle user application that controls the vehicle 102 and enables users to edit and review settings and data associated with the vehicle 102;
- a model training module 226, which trains a machine learning model 250. The model 250 includes at least one neural network and is applied to process vehicle data (e.g., sensor data and vehicle control data) of the vehicle 102;
- a data processing module 228, which performs a plurality of on-vehicle tasks, including, but not limited to, perception and object analysis 230, vehicle localization and environment mapping 232, vehicle drive control 234, vehicle drive planning 236, local operation monitoring 238, and vehicle driving behavior monitoring 240;
- a vehicle database 242, which stores vehicle data 112, including:
    - device settings 243, including common device settings (e.g., service tier, device model, storage capacity, processing capabilities, communication capabilities, and/or medical procedure settings) of the vehicle 102;
    - user account information 244 for the one or more user applications 224 (e.g., user names, security questions, account history data, user preferences, and predefined account settings);
    - network parameters 246 for the one or more communication networks 110, (e.g., IP address, subnet mask, default gateway, DNS server, and host name);
    - training data 248 for training the machine learning model 250;
    - machine learning models 250 for processing vehicle data 112;
    - sensor data 254 captured or measured by the plurality of sensors 260;
    - mapping and location data 256, which is determined from the sensor data 254 to map the vehicle driving environment 100 and locations of the vehicle 102 in the environment 100; and
    - vehicle control data 258, which is automatically generated by the vehicle 102 or manually input by the user via the vehicle control system 290 to drive the vehicle 102.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 206 stores a subset of the modules and data structures identified above. In some embodiments, the memory 206 stores additional modules and data structures not described above.

Figure 3:
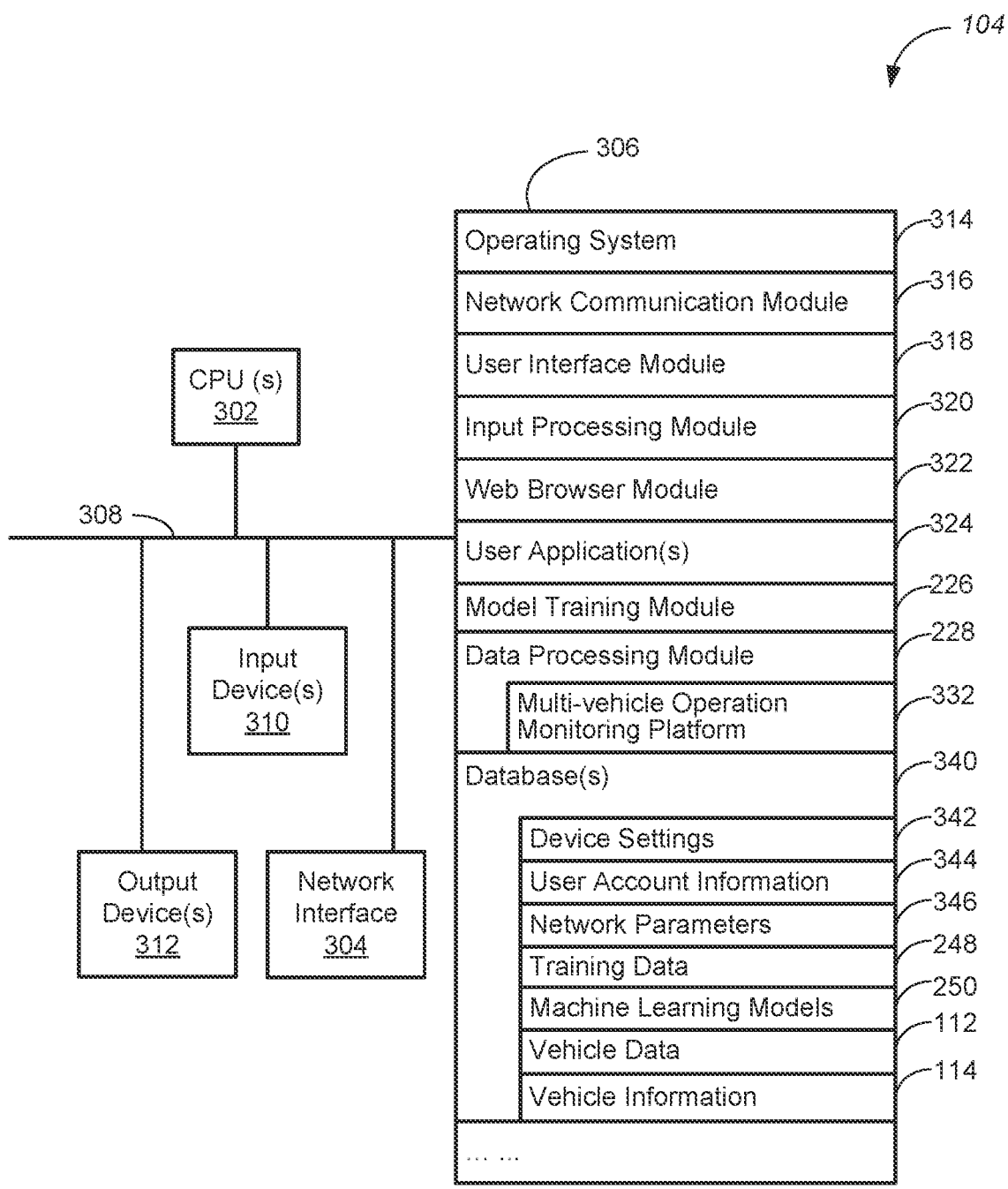
FIG. 3 is a block diagram of an example server for monitoring and managing vehicles in a vehicle driving environment, in accordance with some embodiments.

FIG. 3 is a block diagram of a server 104 for monitoring and managing vehicles 102 in a vehicle driving environment (e.g., the environment 100 in FIG. 1), in accordance with some embodiments. Examples of the server 104 include, but are not limited to, a server computer, a desktop computer, a laptop computer, a tablet computer, or a mobile phone. The server 104 typically includes one or more processing units (CPUs) 302, one or more network interfaces 304, memory 306, and one or more communication buses 308 for interconnecting these components (sometimes called a chipset). The server 104 includes one or more user interface devices. The user interface devices include one or more input devices 310, which facilitate user input, such as a keyboard, a mouse, a voice-command input unit or microphone, a touch screen display, a touch-sensitive input pad, a gesture capturing camera, or other input buttons or controls. Furthermore, in some embodiments, the server 104 uses a microphone and voice recognition or a camera and gesture recognition to supplement or replace the keyboard. In some embodiments, the one or more input devices 310 include one or more cameras, scanners, or photo sensor units for capturing images, for example, of graphic serial codes printed on electronic devices. The server 104 also includes one or more output devices 312, which enable presentation of user interfaces and display content, including one or more speakers and/or one or more visual displays.

The memory 306 includes high-speed random access memory, such as DRAM, SRAM, DDR RAM, or other random access solid state memory devices. In some embodiments, the memory includes non-volatile memory, such as one or more magnetic disk storage devices, one or more optical disk storage devices, one or more flash memory devices, or one or more other non-volatile solid state storage devices. In some embodiments, the memory 306 includes one or more storage devices remotely located from one or more processing units 302. The memory 306, or alternatively the non-volatile memory within memory 306, includes a non-transitory computer readable storage medium. In some embodiments, the memory 306, or the non-transitory computer readable storage medium of the memory 306, stores the following programs, modules, and data structures, or a subset or superset thereof:
- an operating system 314, which includes procedures for handling various basic system services and for performing hardware dependent tasks;
- a network communication module 316, which connects the server 104 to other devices (e.g., vehicles 102, another server 104, and/or client devices 108) via one or more network interfaces (wired or wireless) and one or more communication networks 110, such as the Internet, other wide area networks, local area networks, metropolitan area networks, and so on;
- a user interface module 318, which enables presentation of information (e.g., a graphical user interface for user application 324, widgets, websites and web pages thereof, audio content, and/or video content) at the vehicle 102 via one or more output devices 312 (e.g., displays or speakers);
- an input processing module 320, which detects one or more user inputs or interactions from one of the one or more input devices 310 and interprets the detected input or interaction;
- a web browser module 322, which navigates, requests (e.g., via HTTP), and displays websites and web pages thereof, including a web interface for logging into a user account of a user application 324;
- one or more user applications 324, which are executed at the server 104. The user applications 324 include a vehicle user application that associates vehicles 102 with user accounts and facilitates controlling the vehicles 102, and enables users to edit and review settings and data associated with the vehicles 102;
- a model training module 226, which trains a machine learning model 250, where the model 250 includes at least one neural network and is applied to process vehicle data (e.g., sensor data and vehicle control data) of one or more vehicles 102;
- a data processing module 228, which manages a multi-vehicle operation monitoring platform 332 configured to collect vehicle data 112 from a plurality of vehicles 102, monitor vehicle operation, detect faults, provide driving solutions, and update additional vehicle information 114 to individual vehicles 102 or client devices 108. The data processing module 228 manages vehicle data 112 for each individual vehicle 102 separately or processes vehicle data 112 of multiple vehicles 102 jointly (e.g., statistically, in the aggregate);
- vehicle server data 340, including:
  - device settings 342, which include common device settings (e.g., service tier, device model, storage capacity, processing capabilities, communication capabilities, and/or medical procedure settings) of the server 104;
  - user account information 344 for the one or more user applications 324 (e.g., user names, security questions, account history data, user preferences, and predefined account settings);
  - network parameters 346 for the one or more communication networks 110, (e.g., IP address, subnet mask, default gateway, DNS server, and host name);
  - training data 248 for training the machine learning model 250;
  - machine learning models 250 for processing vehicle data;
  - vehicle data 112, which is collected from a plurality of vehicles 102 and includes sensor data 254, mapping and location data 256, and vehicle control data 258; and
  - additional vehicle information 114, including vehicle operation information, fault information, and/or driving solution information, which are generated from the collected vehicle data 112.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various embodiments. In some embodiments, the memory 306 stores a subset of the modules and data structures identified above. In some embodiments, the memory 306 stores additional modules and data structures not described above.

Figure 4:
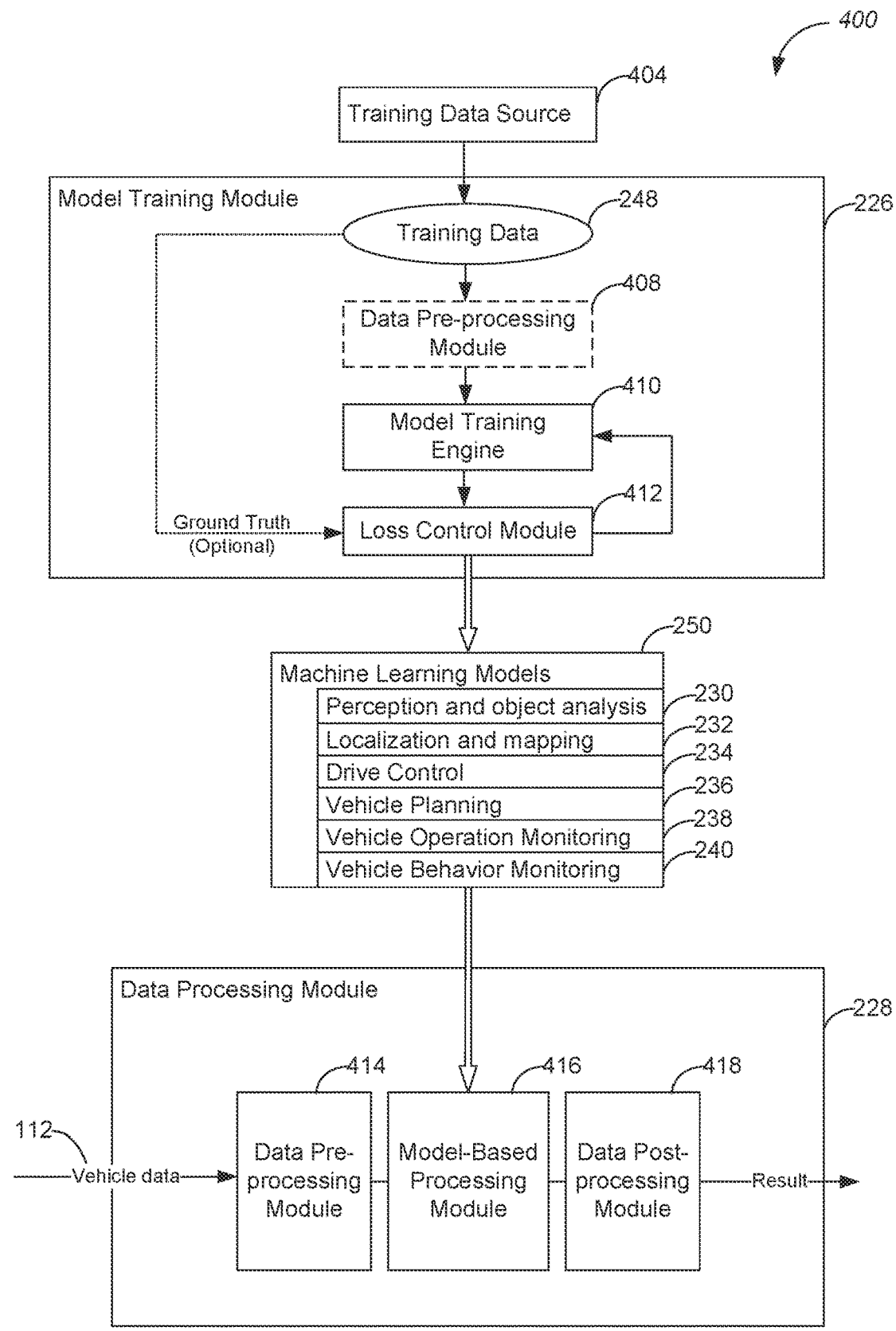
FIG. 4 is a block diagram of a machine learning system for training and applying vehicle data processing models for facilitating at least partial autonomous driving of a vehicle, in accordance with some embodiments.
Figure 5A:
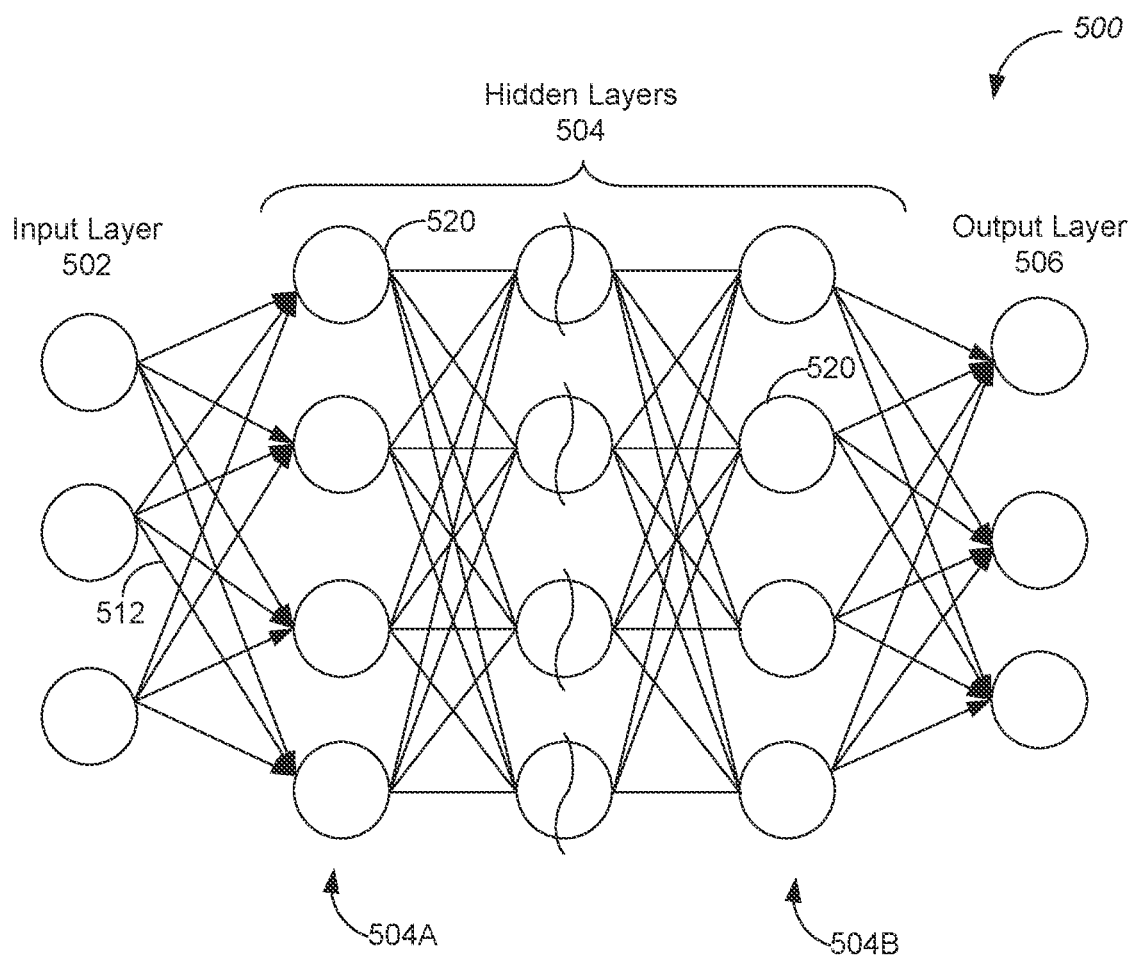
FIG. 5A is a structural diagram of an example neural network applied to process vehicle data in a vehicle data processing model, in accordance with some embodiments.
Figure 5B:
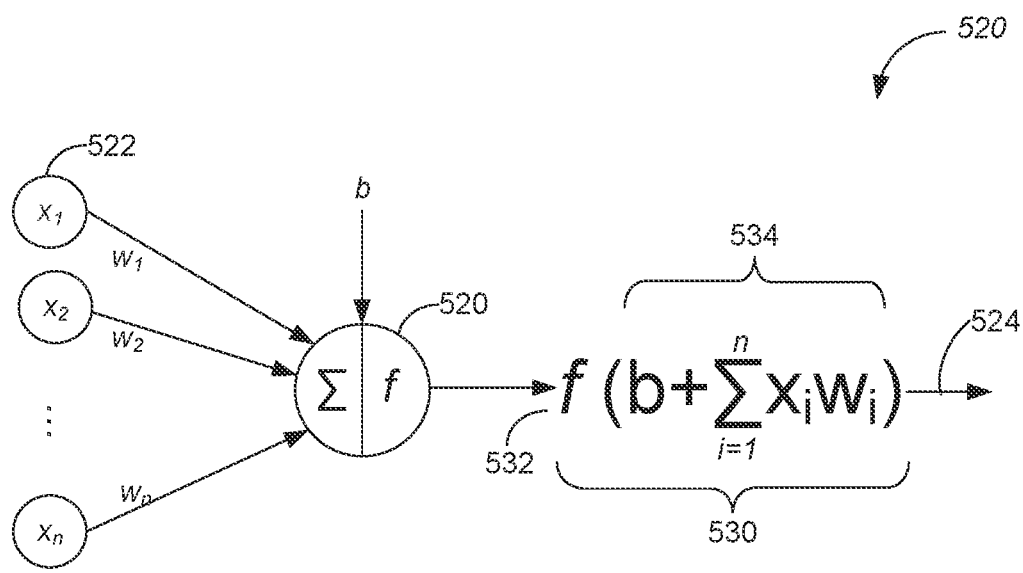
FIG. 5B is an example node in the neural network, in accordance with some embodiments.

FIGS. 4, 5A, and 5B provide background on the machine learning systems described herein, which are helpful in understanding the details of the embodiments described from FIG. 6 onward.

FIG. 4 is a block diagram of a machine learning system 400 for training and applying machine learning models 250 for facilitating driving of a vehicle, in accordance with some embodiments. The machine learning system 400 includes a model training module 226 establishing one or more machine learning models 250 and a data processing module 228 for processing vehicle data 112 using the machine learning model 250. In some embodiments, both the model training module 226 (e.g., the model training module 226 in FIG. 2) and the data processing module 228 are located within the vehicle 102, while a training data source 404 provides training data 248 to the vehicle 102. In some embodiments, the training data source 404 is the data obtained from the vehicle 102 itself, from a server 104, from storage 106, or from a another vehicle or vehicles 102. Alternatively, in some embodiments, the model training module 226 (e.g., the model training module 226 in FIG. 3) is located at a server 104, and the data processing module 228 is located in a vehicle 102. The server 104 trains the data processing models 250 and provides the trained models 250 to the vehicle 102 to process real-time vehicle data 112 detected by the vehicle 102. In some embodiments, the training data 248 provided by the training data source 404 include a standard dataset (e.g., a set of road images) widely used by engineers in the autonomous vehicle industry to train machine learning models 250. In some embodiments, the training data 248 includes vehicle data 112 and/or additional vehicle information 114, which is collected from one or more vehicles 102 that will apply the machine learning models 250 or collected from distinct vehicles 102 that will not apply the machine learning models 250. The vehicle data 112 further includes one or more of sensor data 254, road mapping and location data 256, and control data 258. Further, in some embodiments, a subset of the training data 248 is modified to augment the training data 248. The subset of modified training data is used in place of or jointly with the subset of training data 248 to train the machine learning models 250.

In some embodiments, the model training module 226 includes a model training engine 410, and a loss control module 412. Each machine learning model 250 is trained by the model training engine 410 to process corresponding vehicle data 112 to implement a respective on-vehicle task. The on-vehicle tasks include, but are not limited to, perception and object analysis 230, vehicle localization and environment mapping 232, vehicle drive control 234, vehicle drive planning 236, local operation monitoring 238, and vehicle driving behavior monitoring 240. Specifically, the model training engine 410 receives the training data 248 corresponding to a machine learning model 250 to be trained, and processes the training data to build the machine learning model 250. In some embodiments, during this process, the loss control module 412 monitors a loss function comparing the output associated with the respective training data item to a ground truth of the respective training data item. In these embodiments, the model training engine 410 modifies the machine learning models 250 to reduce the loss, until the loss function satisfies a loss criteria (e.g., a comparison result of the loss function is minimized or reduced below a loss threshold). The machine learning models 250 are thereby trained and provided to the data processing module 228 of a vehicle 102 to process real-time vehicle data 112 from the vehicle.

In some embodiments, the model training module 402 further includes a data pre-processing module 408 configured to pre-process the training data 248 before the training data 248 is used by the model training engine 410 to train a machine learning model 250. For example, an image pre-processing module 408 is configured to format road images in the training data 248 into a predefined image format. For example, the preprocessing module 408 may normalize the road images to a fixed size, resolution, or contrast level. In another example, an image pre-processing module 408 extracts a region of interest (ROI) corresponding to a drivable area in each road image or separates content of the drivable area into a distinct image.

In some embodiments, the model training module 226 uses supervised learning in which the training data 248 is labelled and includes a desired output for each training data item (also called the ground truth in some situations). In some embodiments, the desirable output is labelled manually by people or labelled automatically by the model training model 226 before training. In some embodiments, the model training module 226 uses unsupervised learning in which the training data 248 is not labelled. The model training module 226 is configured to identify previously undetected patterns in the training data 248 without pre-existing labels and with little or no human supervision. Additionally, in some embodiments, the model training module 226 uses partially supervised learning in which the training data is partially labelled.

In some embodiments, the data processing module 228 includes a data pre-processing module 414, a model-based processing module 416, and a data post-processing module 418. The data pre-processing modules 414 pre-processes vehicle data 112 based on the type of the vehicle data 112. In some embodiments, functions of the data pre-processing modules 414 are consistent with those of the pre-processing module 408, and convert the vehicle data 112 into a predefined data format that is suitable for the inputs of the model-based processing module 416. The model-based processing module 416 applies the trained machine learning model 250 provided by the model training module 226 to process the pre-processed vehicle data 112. In some embodiments, the model-based processing module 416 also monitors an error indicator to determine whether the vehicle data 112 has been properly processed in the machine learning model 250. In some embodiments, the processed vehicle data is further processed by the data post-processing module 418 to create a preferred format or to provide additional vehicle information 114 that can be derived from the processed vehicle data. The data processing module 228 uses the processed vehicle data to at least partially autonomously drive the vehicle 102 (e.g., at least partially autonomously). For example, the processed vehicle data includes vehicle control instructions that are used by the vehicle control system 290 to drive the vehicle 102.

FIG. 5A is a structural diagram of an example neural network 500 applied to process vehicle data in a machine learning model 250, in accordance with some embodiments, and FIG. 5B is an example node 520 in the neural network 500, in accordance with some embodiments. It should be noted that this description is used as an example only, and other types or configurations may be used to implement the embodiments described herein. The machine learning model 250 is established based on the neural network 500. A corresponding model-based processing module 416 applies the machine learning model 250 including the neural network 500 to process vehicle data 112 that has been converted to a predefined data format. The neural network 500 includes a collection of nodes 520 that are connected by links 512. Each node 520 receives one or more node inputs 522 and applies a propagation function 530 to generate a node output 524 from the one or more node inputs. As the node output 524 is provided via one or more links 512 to one or more other nodes 520, a weight w associated with each link 512 is applied to the node output 524. Likewise, the one or more node inputs 522 are combined based on corresponding weights $w_1$, $w_2$, $w_3$, and $w_4$ according to the propagation function 530. In an example, the propagation function 530 is computed by applying a non-linear activation function 532 to a linear weighted combination 534 of the one or more node inputs 522.

The collection of nodes 520 is organized into layers in the neural network 500. In general, the layers include an input layer 502 for receiving inputs, an output layer 506 for providing outputs, and one or more hidden layers 504 (e.g., layers 504A and 504B) between the input layer 502 and the output layer 506. A deep neural network has more than one hidden layer 504 between the input layer 502 and the output layer 506. In the neural network 500, each layer is only connected with its immediately preceding and/or immediately following layer. In some embodiments, a layer is a "fully connected" layer because each node in the layer is connected to every node in its immediately following layer. In some embodiments, a hidden layer 504 includes two or more nodes that are connected to the same node in its immediately following layer for down sampling or pooling the two or more nodes. In particular, max pooling uses a maximum value of the two or more nodes in the layer for generating the node of the immediately following layer.

In some embodiments, a convolutional neural network (CNN) is applied in a machine learning model 250 to process vehicle data (e.g., video and image data captured by cameras 266 of a vehicle 102). The CNN employs convolution operations and belongs to a class of deep neural networks. The hidden layers 504 of the CNN include convolutional layers. Each node in a convolutional layer receives inputs from a receptive area associated with a previous layer (e.g., nine nodes). Each convolution layer uses a kernel to combine pixels in a respective area to generate outputs. For example, the kernel may be to a 3×3 matrix including weights applied to combine the pixels in the respective area surrounding each pixel. Video or image data is pre-processed to a predefined video/image format corresponding to the inputs of the CNN. In some embodiments, the pre-processed video or image data is abstracted by the CNN layers to form a respective feature map. In this way, video and image data can be processed by the CNN for video and image recognition or object detection.

In some embodiments, a recurrent neural network (RNN) is applied in the machine learning model 250 to process vehicle data 112. Nodes in successive layers of the RNN follow a temporal sequence, such that the RNN exhibits a temporal dynamic behavior. In an example, each node 520 of the RNN has a time-varying real-valued activation. It is noted that in some embodiments, two or more types of vehicle data are processed by the data processing module 228, and two or more types of neural networks (e.g., both a CNN and an RNN) are applied in the same machine learning model 250 to process the vehicle data jointly.

The training process is a process for calibrating all of the weights $w_i$ for each layer of the neural network 500 using training data 248 that is provided in the input layer 502. The training process typically includes two steps, forward propagation and backward propagation, which are repeated multiple times until a predefined convergence condition is satisfied. In the forward propagation, the set of weights for different layers are applied to the input data and intermediate results from the previous layers. In the backward propagation, a margin of error of the output (e.g., a loss function) is measured (e.g., by a loss control module 412), and the weights are adjusted accordingly to decrease the error. The activation function 532 can be linear, rectified linear, sigmoidal, hyperbolic tangent, or other types. In some embodiments, a network bias term b is added to the sum of the weighted outputs 534 from the previous layer before the activation function 532 is applied. The network bias b provides a perturbation that helps the neural network 500 avoid over fitting the training data. In some embodiments, the result of the training includes a network bias parameter b for each layer.

Figure 6A:
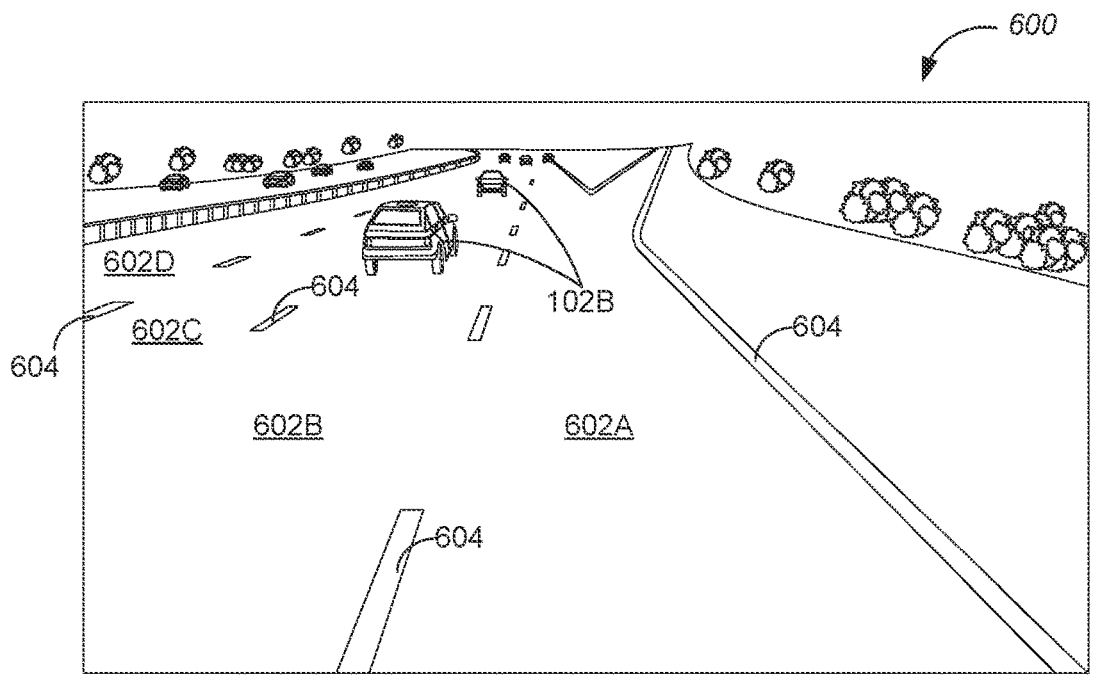
FIG. 6A is an example forward-facing view of a road captured by a camera of a vehicle, in accordance with some embodiments.
Figure 6B:
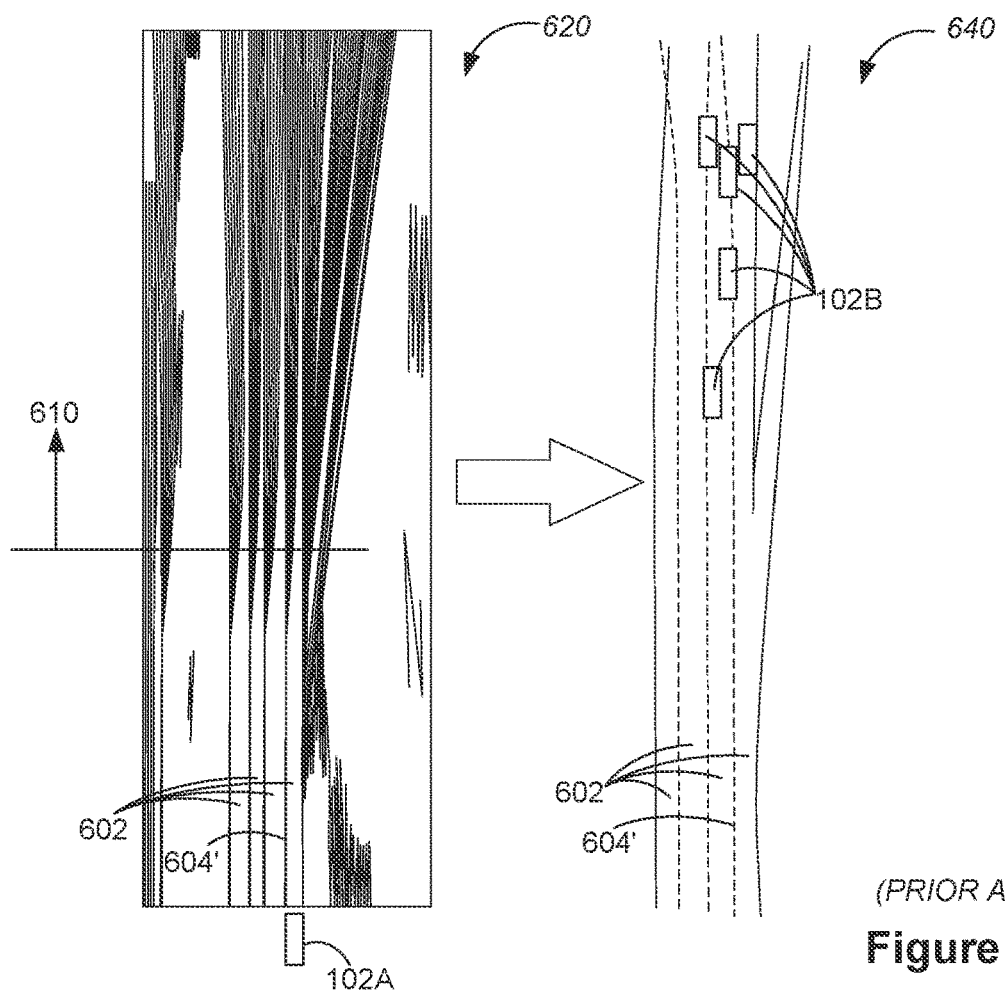
FIG. 6B is example aerial views outputted by a machine learning model, in accordance with some embodiments.

FIG. 6A is an example forward-facing view 600 of a road captured by a camera 266 of a vehicle 102A, in accordance with some embodiments, and FIG. 6B shows examples of aerial views 620 and 640 outputted by a prior art machine learning model, in accordance with some embodiments. An aerial view is otherwise known as a bird's eye view. During autonomous driving, lanes 602 are detected on the forward-facing view 600 and projected into the aerial view 640, thereby allowing the vehicle 102A to follow the lanes 602. Specifically, the prior art machine learning model processes the forward-facing view 600 of the road and outputs the aerial view 620 of the road directly. The aerial view 620 of the road includes a plurality of lanes 602 (e.g., four lanes 602A-602D) defined by a plurality of lane lines 604. The plurality of lanes 602 and the plurality of lane lines 604 may not be visible due to a loped, angled or otherwise uneven ground or occluded lanes, and are inaccurately determined by the prior art machine learning model. In some situations, the prior art machine learning model is trained to control noise associated with imperfect road conditions and visibility (e.g., uneven ground, occluded lanes).

The aerial view 620 includes at least one simulated lane line 604' that decreases in accuracy as compared to the real world lane line 604 with distance from the vehicle 102A. The closer the simulated lane line 604' in the aerial view 620 to the vehicle 102A, the closer the simulated lane line 604' accurately represents the real world lane line 604. As the lane line 604' extends further away from the vehicle 102A to further away from the vehicle (610), the simulated lane line 604' becomes less accurate (e.g., shown as blurred), which indicates that an uncertainty of the simulated lane line 604' increases, and the accuracy of the simulated lane line 604' decreases. This occurs because a location of a lane line 604' is sensitive to the vehicle's pose (e.g., position and orientation) and a lane curvature further from the vehicle (610). A small inaccuracy is amplified as the simulated lane line 604' gets away from the vehicle 102. In some embodiments, a filter is applied to reduce noise of the aerial view 620 to help facilitate generation of the aerial view 640. An accuracy level of the generated aerial view 640 is associated with an accuracy level for the aerial view 620. In some embodiments, additional sensor data is measured by one or more other sensors 260 (e.g., GPS 262) to improve the accuracy level of the simulated lane line 604' outputted by the machine learning model 250.

In some embodiments, obstacle vehicles 102B and lanes 602 are projected in the aerial view 640 such that the aerial view 640 can be used for planning control of the vehicle 102A and controlling driving of the vehicle 102A. For example, the forward-facing view 600 of the road is captured and processed to detect a two-dimensional (2D) obstacle vehicle 102B, and a distance of the 2D obstacle vehicle 102B from the vehicle 102A is estimated using a radar 268, a LiDAR scanner 264, a monocular camera 266, or stereo cameras 266. A three-dimensional (3D) position of the obstacle vehicle 102B is further determined by processing the distance and additional 2D information of the detected 2D object vehicle 102B based on characteristics of the camera 266. In some embodiments, the lanes 602 are detected on the aerial view 640 of the road, and projected within the aerial views 620 and 640 based on an assumption that the road is flat and distance estimation. Referring to FIG. 6B, the simulated lane line 604' blurs, i.e., is erratic or less accurate, the further away that it goes from the vehicle 102A.

When the vehicle 102A operates in a city, the simulated lane line 604' does not extend beyond a braking distance of a vehicle (e.g., 150 meters for a truck) under most circumstances. Inaccurate prediction of the simulated lane line 604' or obstacle vehicle locations does not have a noticeable impact on vehicle planning. Conversely, when the vehicle 102A operates at high speeds on highways, it is important to generate an aerial view with high accuracy particularly for the simulated lane line 604' extending to the braking distance of a truck (e.g., 150 meters). The aerial views 620 and 640 are determined directly from the prior art machine learning model. A slight error in road curvature and vehicle pose might result in large errors in aerial views 620 and 640 and locations of obstacle vehicles 102B, where a longitudinal distance (e.g., 200 meters) from the vehicle 102A exceeds a certain limit.

Figure 7:
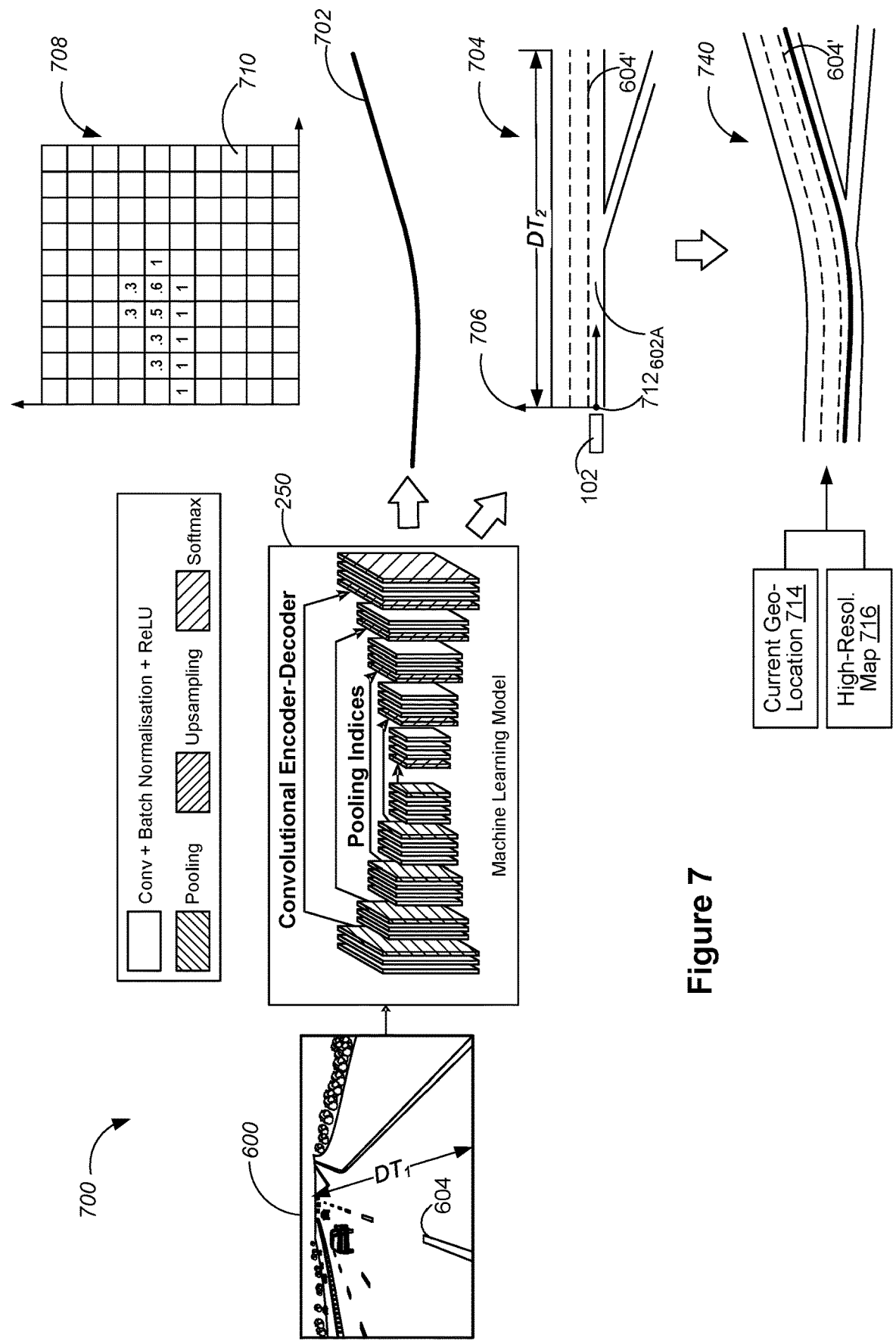
FIG. 7 is a flow diagram of an example process for determining an aerial view of a road by a vehicle (e.g., an ego vehicle) in real time, in accordance with some embodiments.

FIG. 7 is a flow diagram of an example process 700 for determining an aerial view 740 of a road by a vehicle 102 (e.g., an ego vehicle) in real time, in accordance with some embodiments. The vehicle 102 has a machine learning model 250. The vehicle obtains a forward-facing view 600 of the road captured by a front-facing camera 266 of the vehicle 102. In some embodiments, the forward-facing view 600 includes a still image. Alternatively, in some embodiments, the forward-facing view 600 includes a sequence of image frames of a video clip. The vehicle 102 (e.g., data processing module 228 in FIG. 2) applies the machine learning model 250 to process the forward-facing view 600 to determine both a trajectory 702 of the vehicle 102 and a road layout 704 based on a Frenet-Serret coordinate system 706 of the road for the vehicle 102. The trajectory 702 of the vehicle extends within a current lane (also called an ego lane) 602A. This trajectory 702 may or may not an actual trajectory planned for controlling driving of the vehicle 102, but is instead a trajectory that the vehicle 102 is assumed to be following within the current lane 602A. The vehicle 102 (e.g., data processing module 228 in FIG. 2) then combines the trajectory 702 of the vehicle 102 with the road layout 704 to predict the aerial view 740 of the road. The aerial view 740 of the road is used to at least partially autonomously drive the vehicle 102. Specifically, in some situations, the aerial view 740 is applied to plan driving of the vehicle 102 and then control drive of the vehicle 102. The aerial view 740 of the road is applied as one of a plurality of inputs for the data processing module 228, which performs a plurality of on-vehicle tasks, including, but not limited to, vehicle drive control 234 and vehicle drive planning 236 in FIG. 2.

In some situations, noise occurs due to a number of reasons, including the vehicle's pose, shaking of the camera 266, and an uncertainty of a lane curvature. The noise can be reduced or suppressed when determining the trajectory 702 of the vehicle 102 by using a suitable noise suppression filter. It is assumed that the plurality of lanes 602 have substantially constant lane widths that vary within a small range as the plurality of lanes 602 extend to the distance 610 in the forward-facing view 600. The trajectory 702 of the vehicle 102 is then determined with a desired accuracy level based on the aforementioned assumption.

Further, in some embodiments, the trajectory 702 of the vehicle 102 is determined based on a rectangular score map 708 that represents the ego vehicle's coordinates. The rectangular score map 708 includes a plurality of grids 710 each having a grid score, and the grid score indicates a probability that the trajectory 702 of the vehicle 102 passes through the respective grid 710. The trajectory 702 of the vehicle 102 corresponds to a subset of grids 710 having the highest grid scores among the rectangular score map 708. It is further assumed that each grid (i, j) is only connected to (i−1, j') and that ABS(j−j') is less than a grid score variation limit. Based on these assumptions, the machine learning model 250 is applied with dynamic programming to determine the trajectory 702 of the vehicle 102 with the highest score from left to right in the rectangular score map 708. In some embodiments, the trajectory 702 of the vehicle 102 is smoothed before being combined with the road layout 704 (described below) to generate the aerial view 740.

The Frenet-Serret coordinate system 706 of the road is based on the trajectory 702 of the vehicle 102 in the current lane 602A. In an example, the trajectory 702 is a line that has equal distances to two lines 604 defining the current lane 602A. The Frenet-Serret coordinate system 706 is configured to rotate as the vehicle 102 moves along the trajectory 702, and the current lane 602A is configured to remain straight in the Frenet-Serret coordinate system 706. In some embodiments, the lane lines 604 of the road are parallel to each other and define parallel lanes 602 including the current lane 602A, and the lane lines 604 and lanes 602 of the road (which are not limited to the current lane 602A) are straight in the Frenet-Serret coordinate system 706. The Frenet-Serret coordinate system 706 has an origin 712 at the front-facing camera 266 of the vehicle 102 when the forward-facing view 600 of the road is captured. The origin 712 is approximately located in the middle of a starting end of the current lane 602A in which the vehicle 102 is driving.

Both the trajectory 702 and Frenet-Serret coordinate system 706 are associated with the current lane 602 that the vehicle 102 is driving as the forward-facing view 600 is captured. In some situations, the aerial view 740 of the road is generated in real time while the vehicle 102 is driving on the road and in accordance with a determination that the vehicle 102 will continue to drive in the current lane 602A where the forward-facing view 600 is captured. Conversely, in some situations, the vehicle 102 determines that the vehicle 102 is switching to an adjacent lane 602 based on the forward-facing view 600. In some embodiments, the vehicle 102 will suspend applying the machine learning model 250 to determine the trajectory 702 of the vehicle 102 and the road layout 704, until the vehicle 102 completes lane switching and continues to drive in an updated current lane 602A.

In some embodiments, the machine learning model 250 is based on a convolutional neural network (CNN) and includes a semantic segmentation network. For example, the machine learning model 250 includes an encoder-decoder network (e.g., a transformer neural network). In another example, the machine learning model 250 includes a U-Net, which is a symmetric encoder-decoder network. The U-Net is constructed based on a fully convolutional network. The U-Net includes a series of encoding stages, a bottleneck network coupled to the series of encoding stages, and a series of decoding stages coupled to the bottleneck network. The series of decoding stages includes the same number of stages as the series of encoding stages. In an example, the encoder-decoder network has four encoding stages and four decoding stages. The bottleneck network is coupled between the encoding stages 1612 and decoding stages. The forward-facing view 600 is successively processed by the series of encoding stages, the bottleneck network, the series of decoding stages, and separate pooling layers to generate the trajectory 702 of the vehicle 102 and the road layout 704 in the Frenet-Serret coordinate system 706.

Further, in some embodiments, the machine learning model 250 includes two output branches each including one or more neural network layers, and the two output branches are coupled to the same semantic segmentation network that generates a segmentation feature map from the forward-facing view 600 of the road. A first output branch is configured to generate the trajectory 702 of the vehicle 102 from the segmentation feature map. A second output branch is distinct from the first output branch and configured to determine the road layout 704 from the segmentation feature map based on the Frenet-Serret coordinate system 706 of the road.

In some embodiments, the forward-facing view 600 of the road captures a first distance $DT_1$ along the road in front of the vehicle 102, and the aerial view 740 of the road covers a second distance $DT_2$ along the road in front of the vehicle that is at least equal to the first distance $DT_1$, e.g., $DT_2 \leq DT_1$.

In an example, the aerial view 740 of the road covers more than 100 meters, i.e., the second distance $DT_2$ is at least 100 meters. In another example, the aerial view 740 of the road covers more than 200 meters, i.e., the second distance $DT_2$ is at least 200 meters. In yet another example, the aerial view 740 of the road covers more than 500 meters, i.e., the second distance $DT_2$ is at least 500 meters. In some embodiments, the vehicle 102 is a semi-trailer truck 102T in FIG. 1, and the truck 102T has an extended braking distance (e.g., 150 meters) compared with passenger cars 102P. The second distance $DT_2$ covers at least the braking distance of the truck vehicle 102T. How far this second distance $DT_2$ reaches is important for vehicles 102 that require more time of control, e.g., a slow braking truck or a fast moving race car.

In some embodiments, the aerial view 740 includes a plurality of simulated lane lines 604'. An accuracy level of each simulated lane line 604' in the aerial view 740 is measured by a deviation from a corresponding real world lane line 604. Specifically, in some embodiments, an accuracy level of the at least one simulated lane line 604' is determined by measuring from a center of the simulated lane line 604' to a center of the real world lane line 604' or by measuring anywhere on simulated lane line 604' to anywhere on real world lane line 604'. In some embodiments, each simulated lane line 604' of the aerial view 740 decreases in accuracy to a real world lane line 604 with a distance from the vehicle 102. As the estimated lane line 604' extends away from the vehicle 102 towards a far end of the road, the accuracy level of the simulated lane line 604' decreases, and the deviation from the real world lane line 604 increases. In an example, at a distance of 200 meters form the vehicle 102, the deviation of the estimated lane line 604' should remain within 10 centimeters of the corresponding real world lane line 604 on the road. When the vehicle 102 is a truck 102T in FIG. 1, having an extended braking distance (e.g., 150 meters), such accuracy allows the vehicle 102 to make confident decisions regarding automatically driving of the vehicle 102.

In some embodiments, the vehicle 102 obtains a current geographical location 714 of the vehicle 102 from a GPS sensor 262 on the vehicle 102. The vehicle 102 obtains a high resolution (HD) map 716 including an aerial view of a geographic area and a plurality of lane lines 604 associated with the current geographical location. The vehicle 102 at least partially modifies the aerial view 740 based on the HD map 716 and the current geographical location 714 of the vehicle 102, thereby verifying or enhancing the accuracy level of the aerial view 740 of the road.

In some embodiments, the machine learning model 250 is trained on a server 104 and run on the vehicle 102. In some embodiments, the machine learning model 250 is also trained on the vehicle 102, e.g., for updating the model 250. Referring to FIGS. 4 and 7, a computer device used to train the model 250 (e.g., the server 104 or vehicle 102) obtains a set of training views taken of roads from front-facing cameras 266 on one or more vehicles 102, which may or may not include the camera 266 capturing the forward-facing view 600 of the road. The computer device obtains aerial views of the roads as the ground truth. The training views are matched with the aerial views of the roads, e.g., manually. The computer device uses the set of training views and the aerial views of the roads to train the machine learning model 250. Specifically, during training, the computer device applies the machine learning model 250 to process each training view to predict (1) a test trajectory that follows a test lane on which a respective test vehicle is driving and (2) a test road layout based on a Frenet-Serret coordinate system 706 of the test respective vehicle. The computer device combines the test trajectory and the test road layout to generate a test aerial view of the road, and in accordance with a comparison of the test aerial view and the matching aerial view, adjusts the machine learning model 250. The computer device repeats these training operations iteratively, until the test aerial view is matched with the respective matching aerial view. In some embodiments, a matching aerial view used as ground truth includes a map extracted from a map database, and the map is associated with a geographical location where a corresponding training view is captured.

Figure 8:
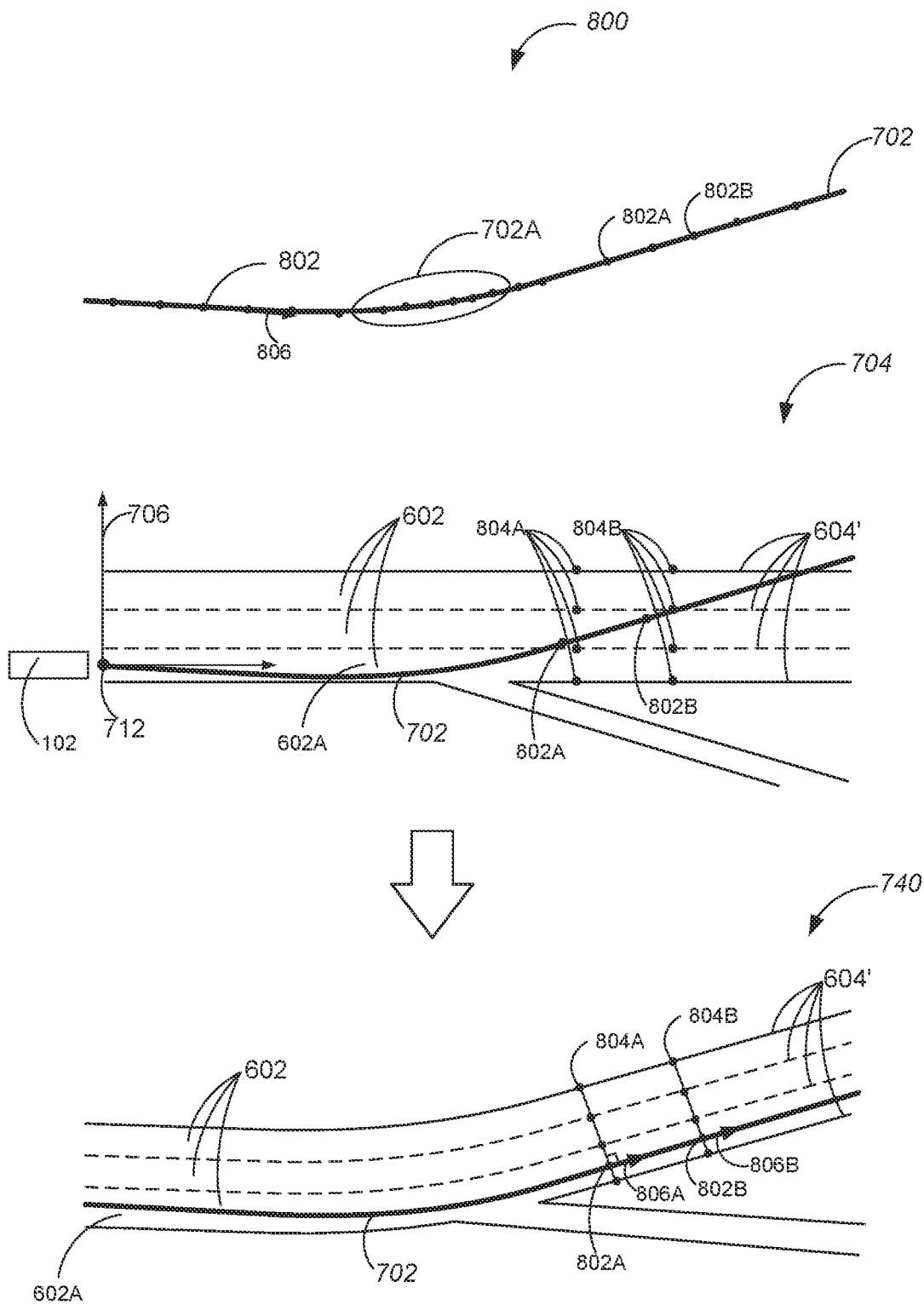
FIG. 8 illustrates example processes of generating an aerial view of a road from a trajectory of a vehicle, in accordance with some embodiments.

FIG. 8 illustrates example processes 800 of generating an aerial view 740 of a road from a trajectory 702 of a vehicle 102, in accordance with some embodiments. As explained above, a machine learning model 250 is applied to process a forward-facing view 600 to determine a trajectory 702 of a vehicle 102 within a current lane 602A and a road layout 704 based on a Frenet-Serret coordinate system 706 of the road for the vehicle 102. The road layout 704 includes a plurality of lane lines 604' defining one or more lanes 602. The trajectory 702 includes a plurality of first points 802. In some embodiments, the trajectory 702 is a continuous path, and the plurality of first points 802 include a first number of discrete points distributed evenly or unevenly on the trajectory 702. Each first point 802 corresponds to a tangent direction 806. Further, in some embodiments, a distribution density of the plurality of first points 802 is proportional to a change rate of the tangent direction 806 of the trajectory 702. The larger the change rate of the tangent direction 806 of the trajectory 702 at the first point 802, the higher the distribution density of the first points 802. For example, a portion 702A of the trajectory 702 that has the largest change rate of the tangent direction 806 of the trajectory 702, also has the highest density of the first points 802 on the trajectory 702.

In some embodiments, the Frenet-Serret coordinate system 706 has an origin 712 located at the front-facing camera 266 of the vehicle 102 capturing the forward-facing view 600. The origin 712 is approximately located in the middle of a starting end of a current lane 602A where the vehicle 102 is driving. The trajectory 702 of the vehicle 102 is moved to overlap the road layout 704, and a starting point of the trajectory 702 overlaps the origin 712 of the Frenet-Serret coordinate system 706. The vehicle 102 determines a curvature of the trajectory 702 at each of the plurality of first points 802, and applies the curvature of the trajectory 702 at each of the plurality of first points 802 to a respective second point 804 of the lane line 604' on the road layout 704. In some embodiments, for each of the plurality of first points 802, a respective line connecting the first point 802 of the trajectory 702 and the respective second point 804 of the lane line 604' is perpendicular to a tangent direction 802T of the trajectory 702 at the first point 802 (in the aerial view 740 in FIG. 8). For example, a first point 802A corresponds to each of the second points 804A on the plurality of lane lines 604' on the road layout 704, and for each second point 804A, the curvature of the trajectory 702 at the first point 802A is applied to the lane line 604' at the respective second point 804A. A respective line connecting the first point 802A of the trajectory 702 and the second point 804A of the lane line 604' is perpendicular to the tangent direction 806A of the trajectory 702 at the first point 802A. For each lane line 604', respective second points 804 of the lane line 604' are connected and smoothed to form a corresponding lane line 604' in the aerial view 740.

Alternatively, in some embodiments, the trajectory 702 of the vehicle 102 is shifted without rotation, such that a starting point of the trajectory 702 overlaps the origin of the Frenet-Serret coordinate system 706. The curvature of the trajectory 702 at each of the plurality of first points 802 is applied to a respective second point 804 of the lane line 604' on the road layout 704. In some embodiments, each of the plurality of first points 802 has a first distance $D_1$ from a starting point of the trajectory 702. The respective second point 804 of the lane line 604' has a second distance $D_2$ from a starting point of the lane line (in the aerial view 740 in FIG. 8). The first and second distances are equal to each other. For example, a first point 802B corresponds to each of the second points 804B on the plurality of lane lines 604' on the road layout 704, and for each second point 804B, the curvature of the trajectory 702 at the first point 802B is applied to the lane line 604' at the respective second point 804B. For each lane line 604', respective second points 804 of the lane line 604' are connected and smoothed to form a corresponding lane line 604' in the aerial view 740.

Figure 9:
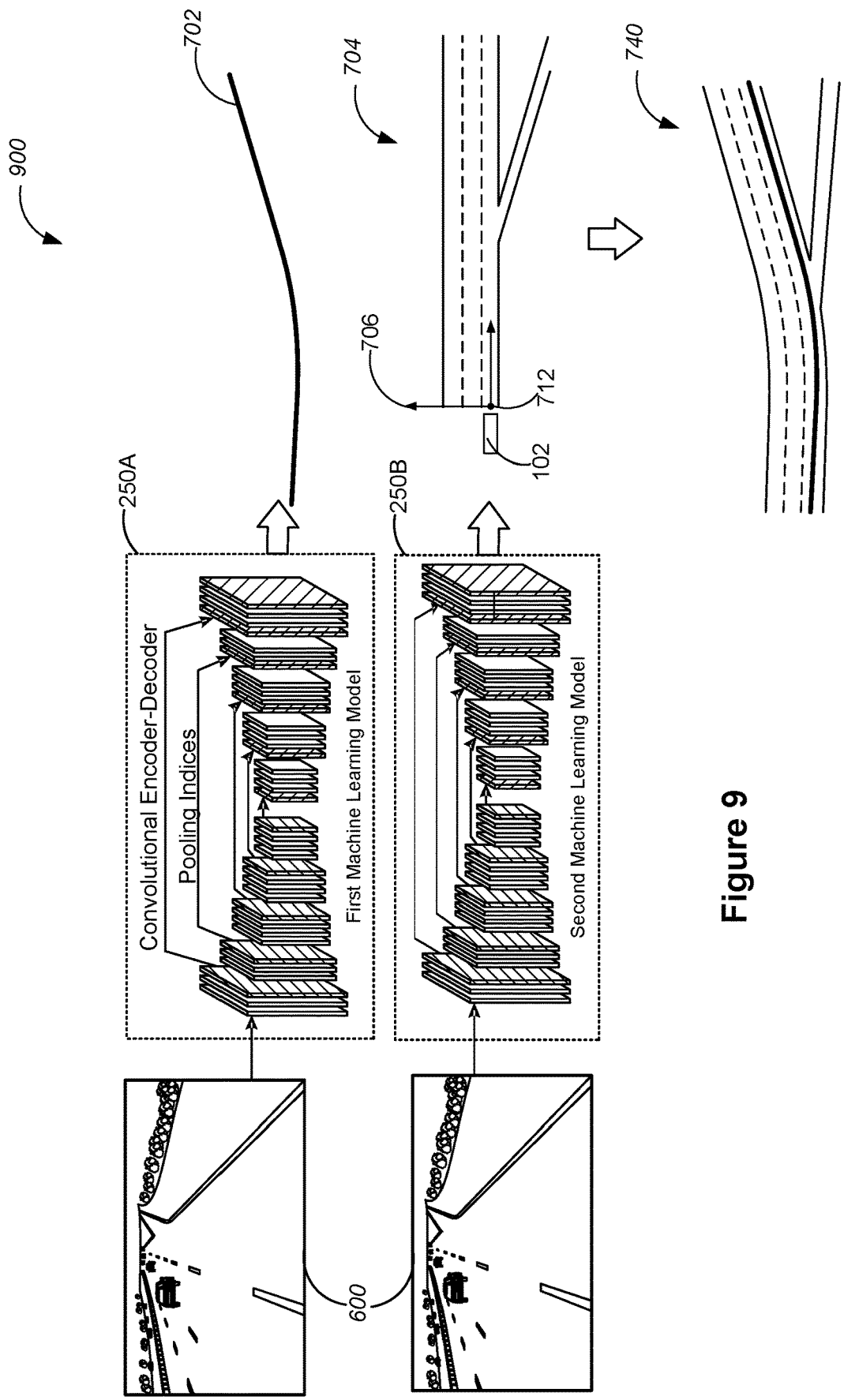
FIG. 9 is a flow diagram of another example process for determining an aerial view of a road by a vehicle in real time, in accordance with some embodiments.

FIG. 9 is a flow diagram of another example process 900 for determining an aerial view 740 of a road by a vehicle 102 in real time, in accordance with some embodiments. The machine learning model 250 includes a first machine learning model 250A and a second machine learning model 250B distinct from the first machine learning model 250A. Both the first and second machine learning models 250 receive the forward-facing view 600 of the road as inputs. The first machine learning model 250A is applied to predict the trajectory 702 of the vehicle 102, and the second machine learning model 250B is applied to determine the road layout 704 based on the Frenet-Serret coordinate system 706 of the road for the vehicle 102. In some embodiments, each of the first machine learning model 250A and the second machine learning model 250B is separately trained to provide the trajectory 702 of the vehicle 102 and the road layout 704 in the Frenet-Serret coordinate system 706 of the road. Alternatively, in some embodiments, the first machine learning model 250A and the second machine learning model 250B is trained jointly in an end-to-end manner.

In some embodiments, each of the first machine learning model 250A and the second machine learning model 250B is based on a convolutional neural network (CNN) and includes a semantic segmentation network. For example, at least one of the first machine learning model 250A and the second machine learning model 250B includes an encoder-decoder network (e.g., U-Net) that is trained separately. In another example, at least one of the first machine learning model 250A and the second machine learning model 250B includes a transformer neural network that is trained separately.

Figure 10A:
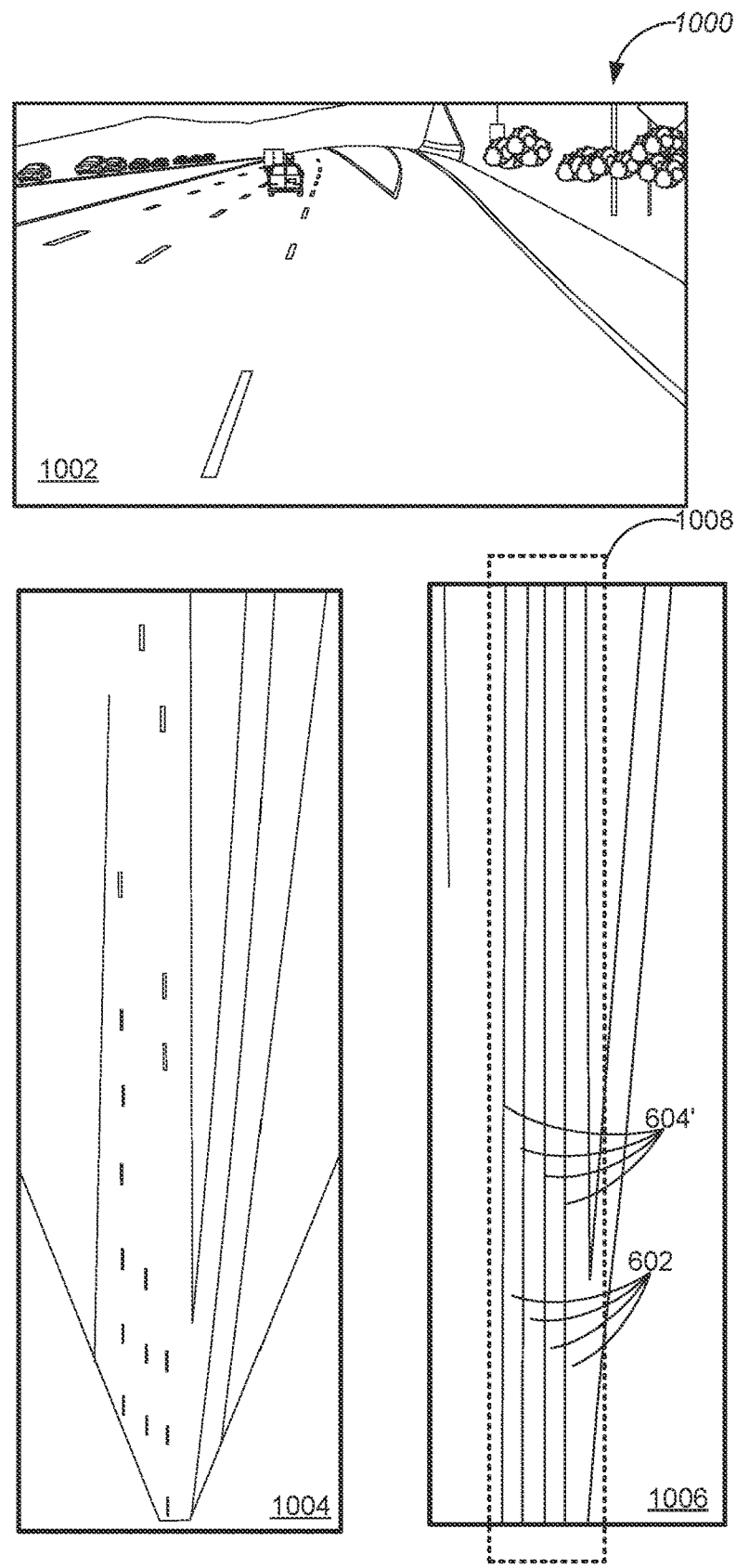
FIGS. 10A and 10B are two example sets of images each of which includes a forward-facing view of a road, a ground truth aerial view of a road, and a reconstructed aerial view, in accordance with some embodiments.
Figure 10B:
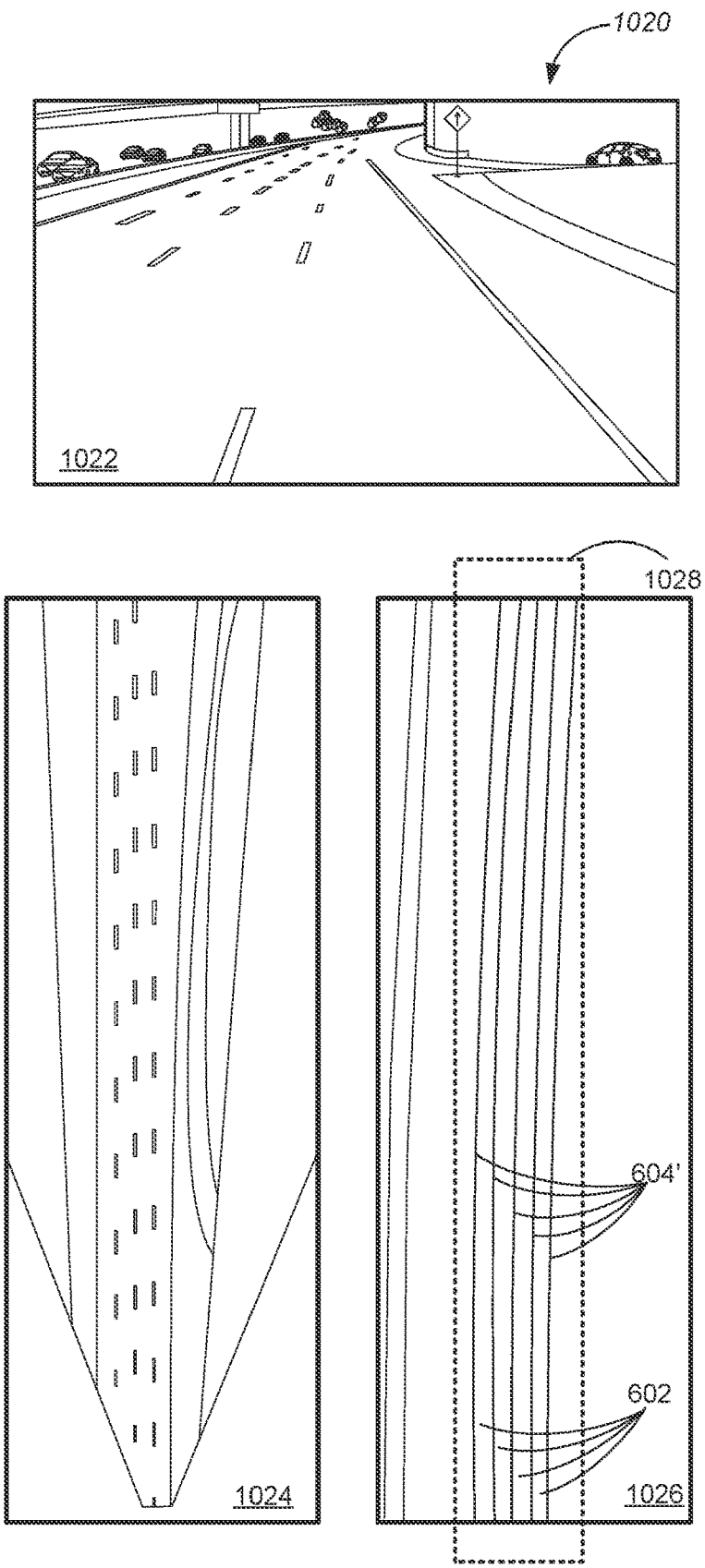

FIGS. 10A and 10B are two example sets of images 1000 and 1020 each of which includes a forward-facing view of a road, a ground truth aerial view of a road, and a reconstructed aerial view, in accordance with some embodiments. Referring to FIG. 10A, a forward-facing view 1002 of a road is captured by a camera 266 of a vehicle 102 and corresponds to a projection view 1004 to the road. A machine learning model 250 is applied to generate a trajectory of the vehicle 102 and a road layout of the road, which are combined to construct an aerial view 1006 of the road. The aerial view 1006 of the road includes a plurality of lanes 602 and corresponding simulated lane lines 604'. A drivable area 1008 on the reconstructed aerial view 1006 includes the plurality of lanes 602 and lane lines 604', and is substantially consistent with a counterpart area on the ground truth aerial view 1004. Referring to FIG. 10B, a forward-facing view 1022 of a road is captured by a camera 266 of a vehicle 102 and corresponds to a projection view 1024 of the road. A machine learning model 250 is applied to generate a trajectory of the vehicle 102 and a road layout of the road, which are combined to construct an aerial view 1026 of the road. The aerial view 1026 of the road includes a plurality of lanes 602 and corresponding simulated lane lines 604'. A drivable area 1028 on the reconstructed aerial view 1006 includes the plurality of lanes 602 and lane lines 604', and is substantially consistent with a counterpart area on the ground truth aerial view 1024.

Figure 11:
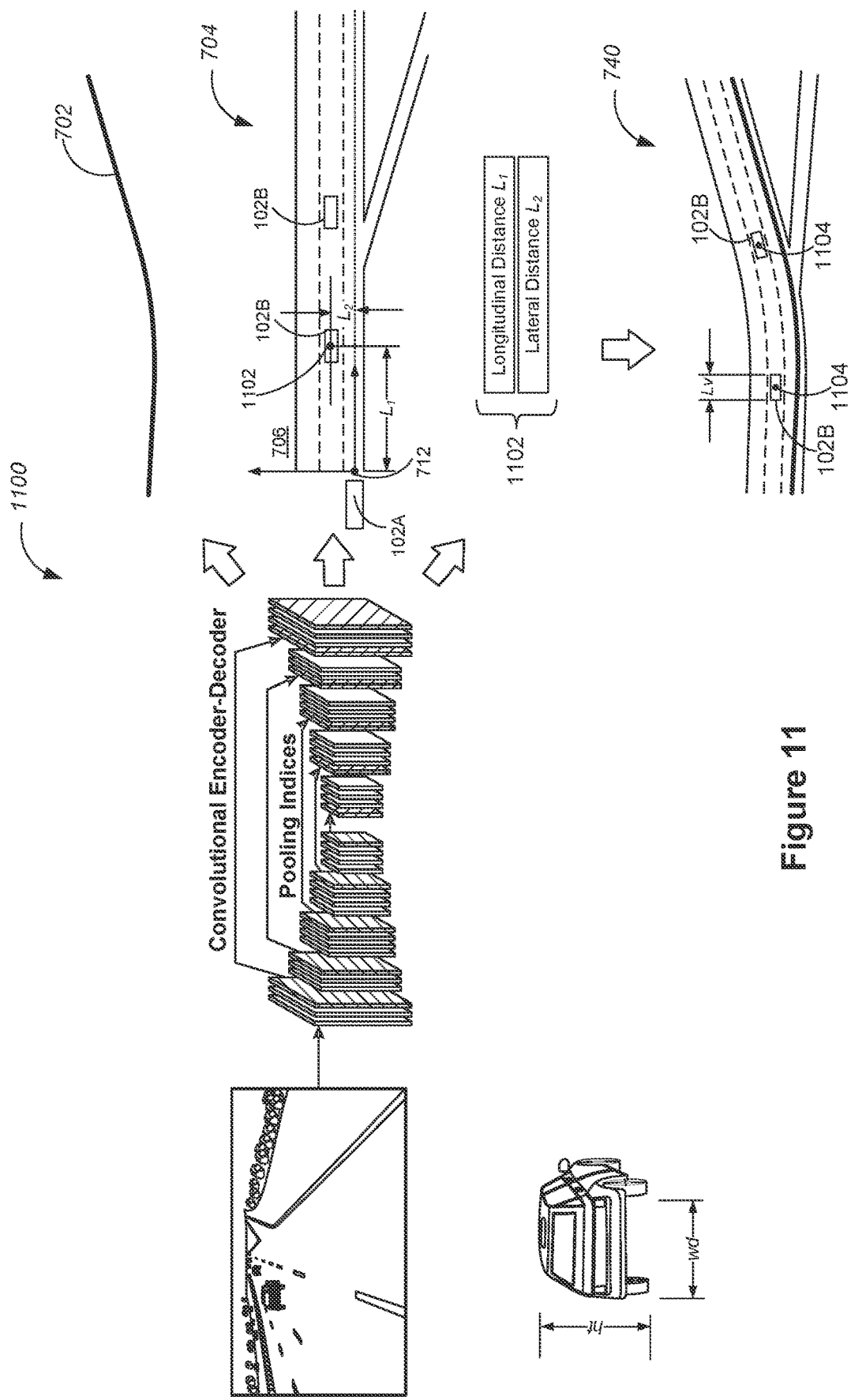
FIG. 11 is a flow diagram of an example process for determining an aerial view of a road including a location of an obstacle vehicle, in accordance with some embodiments.

FIG. 11 is a flow diagram of an example process 1100 for determining an aerial view 740 of a road including a first location 1102 of an obstacle vehicle 102B, in accordance with some embodiments. A vehicle 102A (also called an ego vehicle) has a machine learning model 250. The ego vehicle 102A obtains a forward-facing view 600 (e.g., a still image, a sequence of image frames of a video clip) of the road captured by a front-facing camera 266 of the vehicle 102. The ego vehicle 102A applies the machine learning model 250 to process the forward-facing view 600 to determine (i) a trajectory 702 of the ego vehicle 102A, (ii) a road layout 704 based on a Frenet-Serret coordinate system 706 of the road, and (iii) a first location 1102 of each obstacle vehicle 102B in the Frenet-Serret coordinate system 706 for the ego vehicle 102A. The ego vehicle 102A combines the trajectory 702 of the ego vehicle 102A and the road layout 704 to predict the aerial view 740 of the road, and converts the first location 1102 of each obstacle vehicle 102B to a vehicle location 1104 on the aerial view 740 of the road. The aerial view 740 of the road includes one or more obstacle vehicles 102B each located at the vehicle location 1104, and is used to at least partially autonomously drive the vehicle 102.

In some embodiments, the aerial view 740 of the road is displayed on a display of the ego vehicle 102A. The one or more obstacle vehicle 102B are visualized on the aerial view 740 based on the vehicle location 1104 of each obstacle vehicle 102B. Further, in some embodiments, the ego vehicle 102A determines a width wd or a height ht of each obstacle vehicle 102B on the forward-facing view 600, and estimates a length Lv of the obstacle vehicle 102B based on the width wd or height ht of the obstacle vehicle 102B. The obstacle vehicle is visualized at the vehicle location 1104 of the aerial view 740 of the road using the width wd and length Lv of the obstacle vehicle 102B.

In some embodiments, the first location 1102 of each obstacle vehicle 102B includes a longitudinal distance $L_1$ and a lateral distance $L_2$ in the Frenet-Serret coordinate system 706. The Frenet-Serret coordinate system 706 has an origin 712 at the front-facing camera of the ego vehicle 102A when the forward-facing view of the road is captured. For each obstacle vehicle, the longitudinal distance $L_1$ and lateral distance $L_2$ of a mass center of the respective obstacle vehicle 102B are determined with reference to the origin 712 of the Frenet-Serret coordinate system 706.

Further, in some situations, for each obstacle vehicle 102B, the longitudinal distance $L_1$ has a first distance resolution (i.e., a first accuracy level), and the lateral distance $L_2$ has a second distance resolution (i.e., a secpmd accuracy level) that is smaller than the first distance resolution and a predefined resolution threshold. The longitudinal distance $L_1$ is measured along a first direction that is aligned with a lane where the obstacle vehicle 102B is driving, and the lateral distance $L_2$ is measured along a second direction that is perpendicular to the first direction. The first and second distance resolutions represent accuracy levels of the first location 1102 of the obstacle vehicle 102B in the first and second directions. In an example, the second predefined distance resolution is 20 centimeters. The lateral distance $L_2$ of the obstacle vehicle 102B from the origin 712 is determined to be within 20 centimeters of, or deviate by 20 centimeters from, a real world lateral distance of the obstacle vehicle 102B. Stated another way, a relevant lateral distance of the obstacle vehicle 102B from either of two lane lines 603 defining the lane where the obstacle vehicle 102B is driving deviates from the real world relevant lateral distance by at most 20 centimeters. Conversely, in an example, the longitudinal distance $L_1$ of the obstacle vehicle 102B is not determined as accurately as the lateral distance $L_2$, e.g., the first distance resolution is equal to 1 meter. The longitudinal distance $L_1$ of the obstacle vehicle 102B from the origin 712 is determined to be within 1 meter of, or deviate by 1 meter from, a real world longitudinal distance of the obstacle vehicle 102B.

In some embodiments, the ego vehicle 102A applies one or more on-vehicle sensors 260 that are distinct from the camera 266 to measure a relative location of each obstacle vehicle 102B with reference to the ego vehicle 102A itself, and modifies the vehicle location 1104 (e.g., the distance $L_1$, $L_2$ or $L_2'$) of each obstacle vehicle 102B based on the measured relative location. Examples of the on-vehicle sensors 260 include, but are not limited to, a LiDAR scanner 264 and INS 276. By these means, the relative location measured by these on-vehicle sensors 260 is applied to fine-tune and complement the vehicle location 1104 of each obstacle vehicle 102 determined based on the machine learning model 250.

It is noted that both the road layout 704 of the road and the first location 1102 of the obstacle vehicle 102B are determined in the Frenet-Serret coordinate system 706 of the road. In some situations, noise is introduced by pose shaking and an uncertainty of a lane curvature, and can be reduced or suppressed during the course of determining the trajectory 702 of the vehicle. The plurality of lanes 602 keep substantially constant lane widths that vary within a small range as the plurality of lanes 602 extends to a far end of the road in the forward-facing view 600. The trajectory 702 of the vehicle 102 is determined with a desirable accuracy level, so are the plurality of lanes 602 generated based on the fact that the plurality of lanes 602 keep substantially constant lane widths. Noise is also controllable if the first location 1102 of the obstacle vehicle 102B is determined with respect to an immediately adjacent lane line 604'. By these means, the noise introduced by pose shaking and uncertain lane curvature can be reduced by separately determining the trajectory 702 of the vehicle 102 and predicting the road layout 704 and the first location 1102 of the obstacle vehicle 102B in the Frenet-Serret coordinate system 706.

In some situations, the aerial view 740 is applied to control driving of the vehicle 102 and planning control of the vehicle 102. The aerial view 740 of the road is applied as one of a plurality of inputs for the data processing module 228, which performs a plurality of on-vehicle tasks, including, but not limited to, vehicle drive control 234 and vehicle drive planning 236 in FIG. 2. In some embodiments, in accordance with a determination that the longitudinal distance $L_1$ of an obstacle vehicle 102B is less than a braking distance (e.g., 150 meters) and a determination that the lateral distance $L_2$ of the obstacle vehicle 102B decreases within a lane cutting range, the ego vehicle 102A issues a braking control command to control the ego vehicle 102A that captured the forward-facing view 600 to operate in a braking mode. In some situations, the lane cutting range includes a lane line 604' defining the current lane, and the obstacle vehicle 102B overlaps the lane line and partially enters the current lane 602A when the lateral distance $L_2$ of the obstacle vehicle 102B is within the lane cutting range. For example, the lane cutting range for the lateral distance is ½WV±¾wv with respect to a center line of the current lane 602A or ±¾wv with respect to each lane line defining the current lane 602A, where WV is a width of a current lane 602A and wv is vehicle width of the obstacle vehicle 102B. In another example, the lane cutting range for the lateral distance is ±½wv from either lane line 604' defining the current lane 602A, and the obstacle vehicle 102B is at least partially overlapping with a lane line defining the current lane 602A.

It is noted that a relative lateral distance $L_2'$ of each obstacle vehicle 102B from lane lines 604' of a road has a larger impact on controlling and planning of vehicle driving compared with a longitudinal distance L along a lane 602 where the obstacle vehicle 102B is driving. Controlling and planning of vehicle driving is more sensitive to an error in the lateral distance $L_2$ or $L_2'$ than to an error in the longitudinal distance $L_1$. Specifically, if an obstacle vehicle 102B moves 20 cm laterally closer to a lane line 604', it might indicate that the obstacle vehicle 102B plans to change lanes, and controlling or planning of the ego vehicle 102A has to accommodate this situation. Conversely, in many situations, controlling or planning of the obstacle vehicle 102B does not change, regardless of whether the obstacle vehicle is 99 or 100 meters away from the ego vehicle 102A in a direction substantially aligned with the lanes 602 in the aerial view 740. The process 1100 is implemented to determine the aerial view 740 of the road including first locations 1102 of the obstacle vehicle(s) 102B, allowing the lateral distances $L_2$ or $L_2'$ of the obstacle vehicle(s) 102B to be determined with a better accuracy level than longitudinal distances $L_1$.

Figure 12:
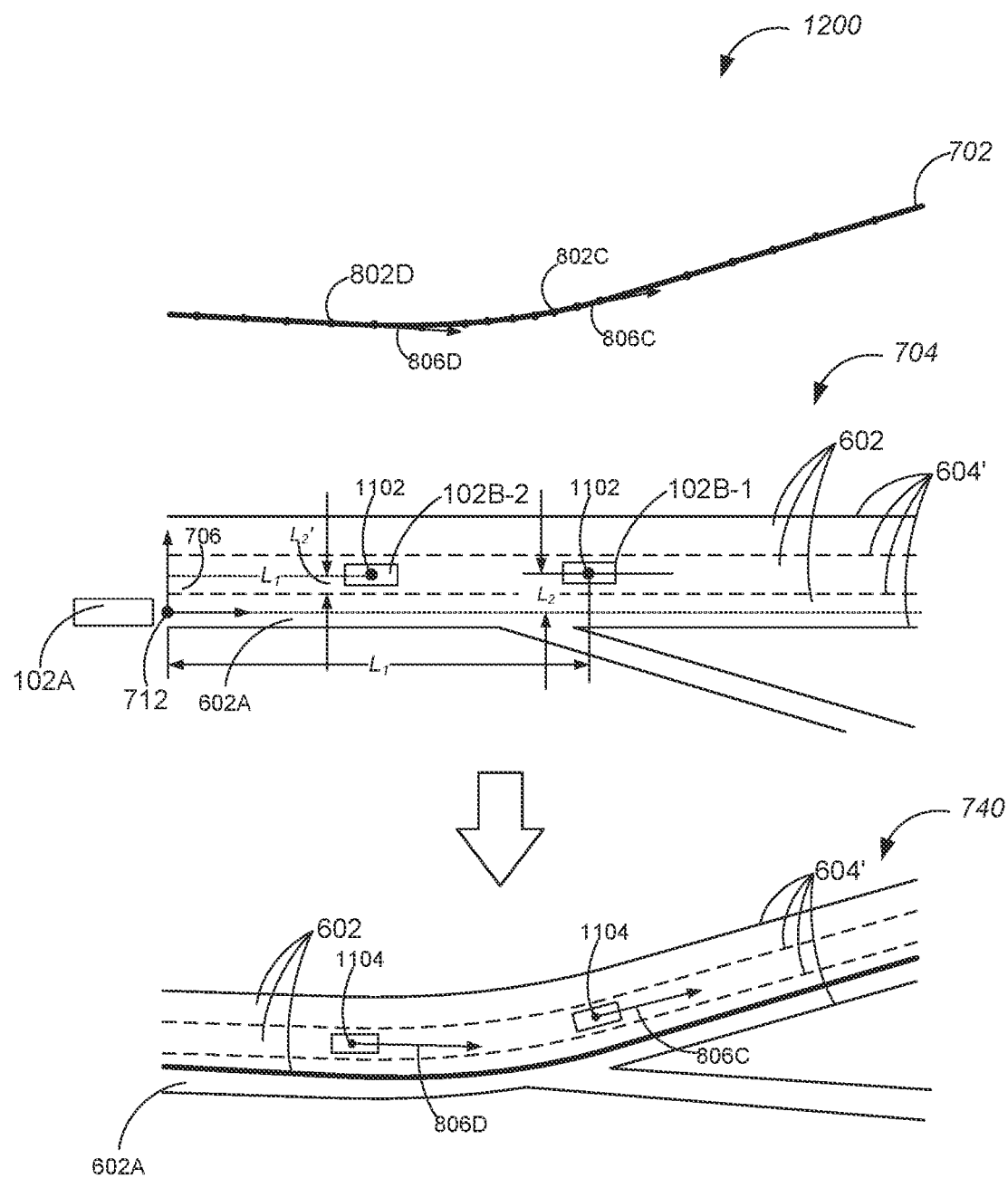
FIG. 12 illustrates an example process of placing an obstacle vehicle on an aerial view of a road, in accordance with some embodiments.

FIG. 12 illustrates an example process 1200 of placing an obstacle vehicle 102B on an aerial view 740 of a road, in accordance with some embodiments. As explained above, a machine learning model 250 is applied to process a forward-facing view 600 to determine a trajectory 702 of a vehicle 102 within a current lane 602A, a road layout 704 based on a Frenet-Serret coordinate system 706 of the road for the vehicle 102, and a first location 1102 of each obstacle vehicle 102B in the Frenet-Serret coordinate system 706. The road layout 704 includes a plurality of lane lines 604' defining one or more lanes 602. The trajectory 702 includes a plurality of first points 802. In some embodiments, the trajectory 702 is a continuous path, and the plurality of first points 802 include a first number of discrete points distributed evenly or unevenly on the trajectory 702. The first location 1102 of each obstacle vehicle 102B is identified by a longitudinal distance $L_1$ and a lateral distance $L_2$ in the Frenet-Serret coordinate system 706.

In some embodiments, the Frenet-Serret coordinate system 706 has an origin 712 at the front-facing camera 266 of the ego vehicle 102A when the forward-facing view 600 of the road is captured. The first location 1102 of each obstacle vehicle 102B (e.g., vehicle 102B-1) further includes a longitudinal distance $L_1$ and a lateral distance $L_2$ of a mass center of the respective obstacle vehicle 102B with reference to the origin 712 of the Frenet-Serret coordinate system 706. The lateral distance $L_2$ is measured between a center line of a current lane 602A and the mass center of the respective obstacle vehicle 102B.

In some embodiments, the first location 1102 of each obstacle vehicle 102B (e.g., vehicle 102B-2) in the Frenet-Serret coordinate system is determined based on a longitudinal distance $L_1$ from a starting point of a respective lane where the obstacle vehicle 102B is driving to a mass center of the obstacle vehicle 102B along a first direction. The first direction is aligned with the respective lane 602 where the obstacle vehicle 102B is driving on the forward-facing view 600. The first location of each obstacle vehicle 102B (e.g., vehicle 102B-2) in the Frenet-Serret coordinate system is further determined based on a lateral distance $L_2$' from a lane line 604' of the respective lane 602 to the mass center of the obstacle vehicle 102B along a second direction. The second direction is perpendicular to the first direction.

In the aerial view 740, each obstacle vehicle 102B is rotated with an angle to be parallel to a tangent direction 806 of the trajectory 702 at a corresponding first point 802. For example, the obstacle vehicles 102B-1 and 102B-2 are parallel to immediately adjacent portions of the lane lines 604' in the road layout 704. In the aerial view 740, the obstacle vehicles 102B-1 and 102B-2 are rotated to be parallel to the tangent directions 806C and 806D of the trajectory 702 at the first points 802C and 802D, respectively. For each obstacle vehicle 102B, the corresponding first point 802 has a distance measured from a starting point of the trajectory 702 of the ego vehicle 102A and along the trajectory 702. The distance of the corresponding first point 802 from the starting point of the trajectory 702 is equal to the longitudinal distance $L_1$ of the respective obstacle vehicle 102B. Alternatively, in some embodiments, the vehicle 102 detects a head lateral distance of a head of an obstacle vehicle 102B from a lane line 604' and a tail lateral distance of a tail of the obstacle vehicle 102B from the lane line 604'. A rotation angle of the obstacle vehicle 102B in the aerial view 740 is determined based on the head and tail lateral distances. The obstacle vehicle 102B is rendered on the aerial view 740 based on at least the head and lateral distances, a length Lv, and a longitudinal distance $L_1$ of the obstacle vehicle 102B.

FIG. 13 is a flow diagram of another example method 1300 for at least partially autonomously driving a vehicle 102, in accordance with some embodiments. In some embodiments, the method 1300 is governed by instructions that are stored in a non-transitory computer readable storage medium and are executed by one or more processors of the vehicle 102 (e.g., e.g., one or more processors 202 of the vehicle 102 in FIG. 2). Each of the operations shown in FIG. 13 may correspond to instructions stored in the computer memory or computer readable storage medium (e.g., the memory 206 in FIG. 2) of the vehicle 102. The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1300 may be combined and/or the order of some operations may be changed.

The vehicle 102 obtains (1302) a forward-facing view 600 of a road captured by a front-facing camera 266. In some embodiments, the forward-facing view 600 includes a still image or a sequence of image frames of a video clip. The vehicle 102 applies (1304) a machine learning model 250 to process the forward-facing view 600 to determine (i) a trajectory of the vehicle, and (ii) a road layout 704 based on a Frenet-Serret coordinate system 706 of the road for the vehicle. The trajectory 702 of the vehicle is controlled within a current lane 602A (also called an ego lane) where the vehicle 102 is driving in the forward-facing view 600. In an example, the current lane 602A is defined by two lane lines 604, and the trajectory 702 of the vehicle is in the middle of the current lane 602A and is an average of the two lane lines 604. In some embodiments, the road layout 704 includes one or more adjacent lanes distinct from the current lane 602A and corresponding lane lines 604. The vehicle 102 further combines (1306) the trajectory 702 of the vehicle 102 and the road layout 704 to predict an aerial view 740 of the road, and uses (1308) the aerial view 740 of the road to at least partially autonomously drive the vehicle 102. In some embodiments, at least partially autonomously driving the vehicle 102 includes controlling driving of the vehicle 102 and planning control of the vehicle 102, and the aerial view 740 of the road is applied as one of a plurality of inputs for at least partially autonomously driving the vehicle 102.

In some embodiments, the Frenet-Serret coordinate system 706 takes into account the trajectory 702 of the vehicle 102. The Frenet-Serret coordinate system 706 is configured to rotate as the vehicle 102 moves along the trajectory 702 of the vehicle 102, and the current lane 602A is configured to remain straight in the Frenet-Serret coordinate system.

In some embodiments, the forward-facing view 600 of the road captures a first distance $DT_1$ along the road in front of the vehicle 102, and the aerial view 740 of the road covers a second distance $DT_2$ along the road in front of the vehicle 102. The second distance $DT_2$ is at least equal to the first distance $DT_1$, i.e., is equal to or less than the first distance $DT_1$. The first distance $DT_1$ is determined by intrinsic parameters (e.g., a focal length) of the camera 266. The forward-facing view 600 of the road captures a lateral field of view (e.g., having a size of 40 meters). In an example, the second distance $DT_2$ of the aerial view 740 of the road is at least 100 meters. In another example, the second distance $DT_2$ of the aerial view 740 of the road is at least 200 meters. In yet another example, the second distance $DT_2$ of the aerial view 740 of the road is at least 500 meters.

In some embodiments, the aerial view 740 includes at least one simulated lane line 604' that decreases in accuracy to a real world lane line 604 with a distance from the vehicle. The closer the simulated lane line 604' in the aerial view 740 to the vehicle, the closer the simulated lane line 604' to the real world lane line 604. For example, the aerial view 740 includes (1310) at least one simulated lane line 604' that, at a distance of 200 meters form the vehicle 102, is within 10 centimeters of a real world lane line 604 on the road. Further, in some embodiments, the vehicle 102 determines an accuracy level of the at least one simulated lane line 604' by measuring from a center of the simulated lane line 604' to a center of the real world lane line 604 or by measuring anywhere on simulated lane line 604' to anywhere on real world lane line 604.

In some embodiments, a server 104 is distinct from the vehicle 102. The server 104 or vehicle 102 obtains a set of training views taken of roads from front-facing cameras on one or more vehicles 102. The server 104 or vehicle 102 obtains aerial views of the roads and matches the training views and the aerial views of the roads (e.g., manually). The server 104 or vehicle 102 uses the set of training views and the aerial views of the roads to train the machine learning model 250. In an example, the server 104 or vehicle 102 obtains a respective ground truth aerial view for each training from a map database based on a geographical location of a respective test vehicle 102. The respective ground truth aerial view is consistent with a perspective of the respective test vehicle.

Further, in some embodiments, the server 104 or vehicle 102 uses the training views and the aerial views of the road to train the machine learning model 250 by, iteratively, applying the machine learning model 250 to process each training view to predict a test trajectory 702 that follows a test lane on which a respective test vehicle is driving and a test road layout based on a Frenet-Serret coordinate system 706 of the test respective vehicle, combining the test trajectory 702 and the test road layout to generate a test aerial view of the road, and in accordance with a comparison of the test aerial view and the matching aerial view, adjusting the machine learning model 250 (e.g., weights of the machine learning model 250) to match the test aerial view and the respective matching aerial view. As such, training of the machine learning model 250 is optionally performed by the server 104 or vehicle 102.

In some embodiments, the vehicle 102 obtains a current geographical location 714 of the vehicle 102 from a GPS sensor on the vehicle 102 and a high resolution map 716 (in FIG. 7). The high resolution map 716 includes an aerial view 740 of a geographic area and a plurality of lane lines 604'. The vehicle 102 at least partially modifies the aerial view 740 based on the high resolution map 716 and the current geographical location of the vehicle 102.

In some embodiments, the machine learning model 250 includes (1312) a semantic segmentation network. The semantic segmentation network is applied to predict the trajectory 702 of the vehicle 102 and determine the road layout 704 concurrently. Examples of the semantic segmentation network include, but are not limited to, U-Net and a transformer neural network.

In some embodiments, the machine learning model 250 includes a first machine learning model 250A and a second machine learning model 250B distinct from the first machine learning model 250A. The vehicle 102 applies the machine learning model 250 by applying the first machine learning model 250A to predict the trajectory 702 of the vehicle and applying the second machine learning model 250B to determine the road layout 704 based on the Frenet-Serret coordinate system 706 of the road for the vehicle.

In some embodiments, the road layout 704 includes (1314) an lane line 604', and the trajectory 702 includes a plurality of first points 802. The trajectory 702 and the road layout 704 are combined by determining (1316) a curvature of the trajectory 702 at each of the plurality of first points 802 and applying (1318) the curvature of the trajectory 702 at each of the plurality of first points 802 to a respective second point 804 of the lane line 604' in the road layout 704. For each of the plurality of first points 802 (e.g., first point 802A), a respective line connecting the first point 802 of the trajectory 702 and the respective second point 804 of the lane line 604' is (1320) perpendicular to a tangent direction 806 of the trajectory 702 at the first point 802.

In some embodiments, the road layout 704 includes (1314) an lane line 604', and the trajectory 702 includes a plurality of first points 802. The trajectory 702 and the road layout 704 is combined by determining (1316) a curvature of the trajectory 702 at each of the plurality of first points 802 and applying (1318) the curvature of the trajectory 702 at each of the plurality of first points 802 to a respective second point 804 of the lane line 604'. Each first point 802 (e.g., first point 802B) of the trajectory 702 has (1322) a first distance from a starting point of the trajectory 702, and the respective second point 804 of the lane line 604' has a second distance from a starting point of the lane line 604'. The first and second distances are equal to each other.

In some embodiments, the aerial view 740 of the road is generated in real time while the vehicle is driving on the road and in accordance with a determination that the vehicle continues to drive in a current lane where the forward-facing view 600 is captured.

It should be understood that the particular order in which the operations in FIG. 13 have been described are merely exemplary and are not intended to indicate that the described order is the only order in which the operations could be performed. One of ordinary skill in the art would recognize various ways to creating an aerial view and at least partially autonomously driving a vehicle accordingly. Additionally, it should be noted that details described with respect to FIGS. 1-12 and 14 are also applicable in an analogous manner to the method 1300 described above with respect to FIG. 13. For brevity, these details are not repeated here.

Figure 14:
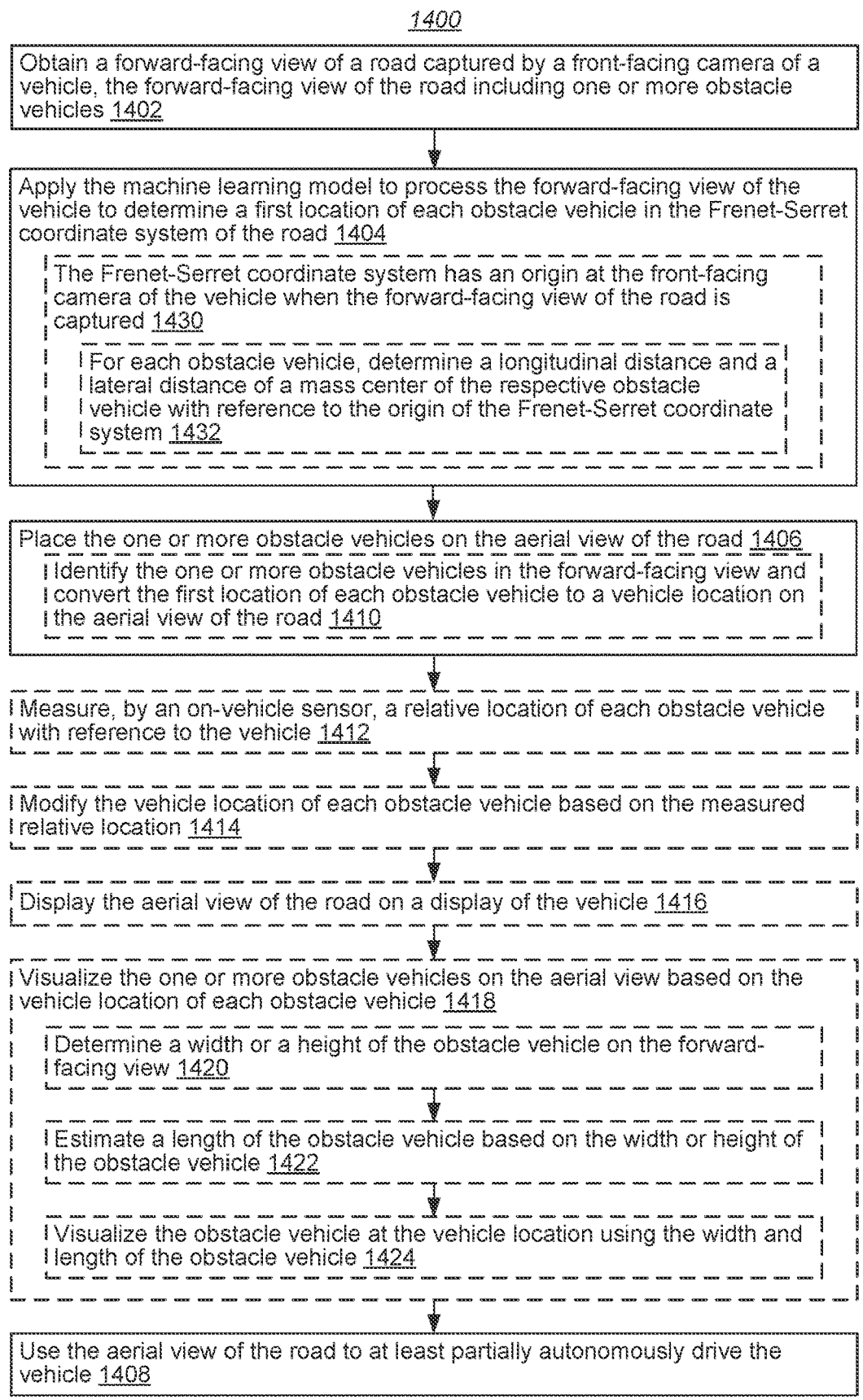
FIG. 14 is a flow diagram of another example method for at least partially autonomously driving a vehicle, in accordance with some embodiments.

FIG. 14 is a flow diagram of another example method 1400 for at least partially autonomously driving a vehicle, in accordance with some embodiments. In some embodiments, the method 1400 is governed by instructions that are stored in a non-transitory computer readable storage medium and are executed by one or more processors of a computer system (e.g., one or more processors 202 of a vehicle 102A in FIG. 2). Each of the operations shown in FIG. 14 may correspond to instructions stored in the computer memory or computer readable storage medium (e.g., the memory 206 in FIG. 2) of the vehicle 102A (also called an ego vehicle 102A). The computer readable storage medium may include a magnetic or optical disk storage device, solid state storage devices such as Flash memory, or other non-volatile memory device or devices. The computer readable instructions stored on the computer readable storage medium may include one or more of: source code, assembly language code, object code, or other instruction format that is interpreted by one or more processors. Some operations in the method 1400 may be combined and/or the order of some operations may be changed.

The vehicle 102A obtains (1402) a forward-facing view 600 of a road captured by a front-facing camera 266. The forward-facing view 600 of the road includes one or more obstacle vehicles 102B. The vehicle 102A applies (1404) a machine learning model 250 to process the forward-facing view 600 of the vehicle 102A to determine a first location 1102 of each obstacle vehicle 102B in a Frenet-Serret coordinate system 706 of the road. The vehicle 102A obtains an aerial view 740 of the road, places (1406) the one or more obstacle vehicles 102B on the aerial view 740 of the road, and uses (1408) the aerial view 740 of the road to at least partially autonomously drive the vehicle 102. In some embodiments, the vehicle 102A identifies (1410) the one or more obstacle vehicles 102B in the forward-facing view 600 and converts the first location 1102 of each obstacle vehicle 102B to a vehicle location 1104 on the aerial view 740 of the road. In some embodiments, an on-vehicle sensor 260 (e.g., LiDAR scanner 264 and INS 276) measures (1412) a relative location of each obstacle vehicle 102B with reference to the vehicle 102A and modifies (1414) the vehicle location 1104 of each obstacle vehicle 102B based on the measured relative location.

In some embodiments, the vehicle 102A applies the machine learning model 250 to process the forward-facing view 600 to determine a road layout, and the first location of each obstacle vehicle is measured with respect to the road layout.

In some embodiments, the vehicle 102A applies the machine learning model 250 (FIGS. 2 and 7) to process the forward-facing view 600 to determine a trajectory 702 of the vehicle 102A and a road layout 704 based on the Frenet-Serret coordinate system 706 of the road for the vehicle 102A. The vehicle 102A combines the trajectory 702 of the vehicle 102A and the road layout 704 to predict the aerial view 740 of the road.

Referring to FIG. 12, in some embodiments, the vehicle 102A determines the first location 1102 of each obstacle vehicle 102B by determining a lateral distance $L_2'$ (FIG. 12) from a lane line of a respective lane where the obstacle vehicle 102B is driving to a mass center of the obstacle vehicle 102B along a direction that is perpendicular to the lane line. The first location 1102 of each obstacle vehicle includes the lateral distance $L_2'$ (FIG. 12) and the obstacle vehicle placed on the aerial view of the road based on the lateral distance $L_2'$ (FIG. 12). In some embodiments, the vehicle 102A determines the first location 1102 of each obstacle vehicle 102B in the Frenet-Serret coordinate system 706 by determining both a longitudinal distance $L_1$ from a starting point of a respective lane 602 where the obstacle vehicle 102B is driving to a mass center of the obstacle vehicle 102B along a first direction and determining a lateral distance $L_2'$ from a lane line of the respective lane to the mass center of the obstacle vehicle 102B along a second direction. The first direction is aligned with the respective lane 602 where the obstacle vehicle 102B is driving on the forward-facing view 600. The second direction is perpendicular to the first direction.

In some embodiments, the Frenet-Serret coordinate system 706 has (1430) an origin 712 at the front-facing camera 266 of the vehicle 102A when the forward-facing view 600 of the road is captured. The vehicle 102 determines the first location 1102 of each obstacle vehicle 102B in the Frenet-Serret coordinate system by determining (1432) a longitudinal distance $L_1$ and a lateral distance $L_2$ of a mass center of the respective obstacle vehicle 102B with reference to the origin 712 of the Frenet-Serret coordinate system 706. Further, in some embodiments, for each obstacle vehicle 102B, the longitudinal distance $L_1$ has a first distance resolution, and the lateral distance $L_2$ has a second distance resolution that is smaller than the first distance resolution and a predefined resolution threshold. In some embodiments, referring to FIG. 12, in accordance with a determination that the longitudinal distance $L_1$ of a first obstacle vehicle 102B-1 is less than a braking distance and a determination that the lateral distance $L_2$ of the first obstacle vehicle 102B-1 decreases within a lane cutting range, the vehicle 102A issues (1414) a braking control command to control the vehicle 102A that captured the forward-facing view 600 to operate in a braking mode. The aerial view 740 of the road is used to at least partially autonomously drive the vehicle 102A in the braking mode. In an example, when the lateral distance D2 is in the lane cutting range, the obstacle vehicle 102B-1 is at least partially overlapping with a lane line 602 defining the current lane 602A. Additionally, in some embodiments, the lane cutting range includes a lane line 604' defining the current lane 602A, and the first obstacle vehicle 102B-1 overlaps the lane line 604' and partially enters the current lane 602A when the lateral distance $L_2$ of the first obstacle vehicle 102B-1 is within the lane cutting range.

In some embodiments, the vehicle 102A displays (1416) the aerial view 740 of the road on a display of the vehicle 102A, and visualizes (1418) the one or more obstacle vehicles 102B (e.g., 102B-1 and 102B-2 on FIG. 12) on the aerial view 740 based on the vehicle location 1104 of each obstacle vehicle 102B. Further, in some embodiments, referring to FIG. 11, the vehicle 102A visualizes the one or more obstacle vehicles 102B on the aerial view 740 by for each obstacle vehicle, determining (1420) a width wd or a height ht of the obstacle vehicle 102B on the forward-facing view 600, estimating (1422) a length Lv of the obstacle vehicle 102B based on the width wd or height ht of the obstacle vehicle 102B, and visualizing (1424) the obstacle vehicle 102B at the vehicle location 1104 using the width wd and length Lv of the obstacle vehicle 102B.

It should be understood that the particular order in which the operations in FIG. 14 have been described are merely exemplary and are not intended to indicate that the described order is the only order in which the operations could be performed. One of ordinary skill in the art would recognize various ways to creating an aerial view and at least partially autonomously driving a vehicle accordingly. Additionally, it should be noted that details described with respect to FIGS. 1-13 are also applicable in an analogous manner to the method 1400 described above with respect to FIG. 14. For brevity, these details are not repeated here.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., according to a communication protocol). In this manner, computer-readable media generally may correspond to (1) tangible computer-readable storage media which is non-transitory or (2) a communication medium, such as a signal or carrier wave. Data storage media may be any available media that can be accessed by one or more computers or one or more processors to retrieve instructions, code and/or data structures for implementation of the embodiments described in the present application. A computer program product may include a computer-readable medium.

The terminology used in the description of the embodiments herein is for the purpose of describing particular embodiments only and is not intended to limit the scope of claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first and second may be used herein to describe various elements, these elements should not be limited by these terms. These terms are only used to distinguish one element from another. For example, a first electrode could be termed a second electrode, and, similarly, a second electrode could be termed a first electrode, without departing from the scope of the embodiments. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative embodiments will be apparent to those of ordinary skill in the art having the benefit of the teachings presented in the foregoing descriptions and the associated drawings. The embodiments are described in order to best explain the principles of the invention, the practical application, and to enable others skilled in the art to understand the invention for various embodiments and to utilize the underlying principles and various embodiments with various modifications as are suited to the particular use contemplated. Therefore, the scope of the claims is not to be limited to the specific examples of the embodiments disclosed. Modifications and other embodiments are intended to be included within the scope of the appended claims.

What is claimed is:

1. A method for at least partially autonomously driving a vehicle that includes one or more processors and memory, the method comprising:
    obtaining a forward-facing view of a road captured by a front-facing camera of the vehicle;
    processing the forward-facing view to determine (i) a trajectory of the vehicle, and (ii) a road layout based on a Frenet-Serret coordinate system of the road for the vehicle, where the road layout includes a lane line, and the trajectory includes a plurality of first points;
    determining a curvature of the trajectory at each of the plurality of first points;
    applying the curvature of the trajectory at each of the plurality of first points to a respective one of a plurality of second points associated with the lane line in the road layout; and
    based on the road layout, at least partially autonomously driving the vehicle.

2. The method of claim 1, wherein for each of the plurality of first points, a respective line connecting the first point of the trajectory and the respective one of the plurality of second points associated with the lane line, is substantially perpendicular to a tangent direction of the trajectory at the first point.

3. The method of claim 1, wherein each first point of the trajectory has a first distance from a starting point of the trajectory, and the respective second point associated with the lane line has a second distance from a starting point along its line, the first and second distances being equal to each other.

4. The method of claim 1, wherein:
    the trajectory of the vehicle and the road layout are combined to predict an aerial view of the road in which the curvature of the road layout is adjusted to substantially follow the curvature of the trajectory.

5. The method of claim 4, wherein the forward-facing view of the road captures a first distance along the road in front of the vehicle, and the aerial view of the road covers a second distance along the road in front of the vehicle, the second distance at least equal to the first distance.

6. The method of claim 5, wherein the second distance is at least 100 meters.

7. The method of claim 5, wherein the second distance is at least 200 meters.

8. The method of claim 5, wherein the second distance is at least 500 meters.

9. The method of claim 1, further comprising:
    obtaining a current geographical location of the vehicle from a GPS sensor on the vehicle;
    obtaining a high resolution map; and
    at least partially modifying the road layout based on the high resolution map and the current geographical location of the vehicle.

10. The method of claim 1, wherein after the curvature of the trajectory is applied, the lane line includes at least one simulated lane line that decreases in accuracy to a real world lane line with a distance from the vehicle.

11. A vehicle, comprising:
    one or more processors; and
    memory storing one or more programs configured for execution by the one or more processors, the one or more programs comprising instructions for:
        obtaining a forward-facing view of a road captured by a front-facing camera of the vehicle;
        processing the forward-facing view to determine (i) a trajectory of the vehicle, and (ii) a road layout based on a Frenet-Serret coordinate system of the road for the vehicle, where the road layout includes a lane line, and the trajectory includes a plurality of first points;
        determining a curvature of the trajectory at each of the plurality of first points;
        applying the curvature of the trajectory at each of the plurality of first points to a respective one of a plurality of second points associated with the lane line in the road layout; and
        based on the road layout, at least partially autonomously driving the vehicle.

12. The vehicle of claim 11, wherein the curvature of the trajectory is applied to the lane line in real time, while the vehicle is driving on the road and in accordance with a determination that the vehicle continues to drive in a current lane where the forward-facing view is captured.

13. The vehicle of claim 11, wherein a semantic segmentation network is applied to predict the trajectory of the vehicle and determine the road layout concurrently.

14. The vehicle of claim 11, wherein after the curvature of the trajectory is applied, the lane line includes at least one simulated lane line that, at a distance of 200 meters from the vehicle, is within 10 centimeters of a real world lane line on the road.

15. The vehicle of claim 14, the one or more programs further comprising instructions for:
    determining an accuracy level of the at least one simulated lane line by measuring from a center of the at least one simulated lane line to a center of the real world lane line at the distance of 200 meters from the vehicle.

16. A non-transitory computer-readable storage medium storing one or more programs configured for execution by one or more processors of a vehicle, the one or more programs comprising instructions for:
    obtaining a forward-facing view of a road captured by a front-facing camera of the vehicle;
    processing the forward-facing view to determine (i) a trajectory of the vehicle, and (ii) a road layout based on a Frenet-Serret coordinate system of the road for the vehicle, where the road layout includes a lane line, and the trajectory includes a plurality of first points;
    determining a curvature of the trajectory at each of the plurality of first points;
    applying the curvature of the trajectory at each of the plurality of first points to a respective one of a plurality of second points associated with the lane line in the road layout; and
    based on the road layout, at least partially autonomously driving the vehicle.

17. The non-transitory computer-readable storage medium of claim 16, wherein at least partially autonomously driving the vehicle includes controlling driving of the vehicle and planning control of the vehicle, and the road layout is applied as one of a plurality of inputs for at least partially autonomously driving the vehicle.

18. The non-transitory computer-readable storage medium of claim 16, wherein processing the forward-facing view further comprises, separately:
   predicting the trajectory of the vehicle; and
   determining the road layout based on the Frenet-Serret coordinate system of the road for the vehicle.

19. The non-transitory computer-readable storage medium of claim 16, the one or more programs further comprising instructions for:
   obtaining a set of training views taken of roads from front-facing cameras on one or more vehicles;
   obtaining aerial views of the roads;
   matching the set of training views and the aerial views of the roads; and
   using the set of training views and the aerial views of the roads determine operations for processing the forward-facing view.

20. The non-transitory computer-readable storage medium of claim 19, wherein using the set of training views and the aerial views of the road to determine operations for processing the forward-facing view further comprises, iteratively:
   processing each training view to predict (1) a test trajectory that follows a test lane on which a respective test vehicle is driving and (2) a test road layout based on a Frenet-Serret coordinate system of the test respective vehicle;
   combining the test trajectory and the test road layout to generate a test aerial view of the road; and
   in accordance with a comparison of the test aerial view and the matching aerial view, determining the operations for processing the forward-facing view to match the test aerial view and the respective matching aerial view.

* * * * *